(12) United States Patent
Da Silva et al.

(10) Patent No.: US 11,595,840 B2
(45) Date of Patent: Feb. 28, 2023

(54) CELL QUALITY DERIVATION CONFIGURATION

(71) Applicant: Telefonaktiebolaget LM Ericsson (publ), Stockholm (SE)

(72) Inventors: Icaro L. J. Da Silva, Solna (SE); Muhammad Kazmi, Sundbyberg (SE); Iana Siomina, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 179 days.

(21) Appl. No.: 16/493,152

(22) PCT Filed: Dec. 21, 2017

(86) PCT No.: PCT/IB2017/058313
§ 371 (c)(1),
(2) Date: Sep. 11, 2019

(87) PCT Pub. No.: WO2018/172842
PCT Pub. Date: Sep. 27, 2018

(65) Prior Publication Data
US 2020/0120526 A1    Apr. 16, 2020

Related U.S. Application Data

(60) Provisional application No. 62/476,536, filed on Mar. 24, 2017.

(51) Int. Cl.
*H04W 24/10* (2009.01)
*H04B 7/06* (2006.01)
(Continued)

(52) U.S. Cl.
CPC .......... *H04W 24/10* (2013.01); *H04B 7/0617* (2013.01); *H04B 17/101* (2015.01);
(Continued)

(58) Field of Classification Search
CPC ............... H04W 24/10; H04W 56/001; H04W 72/0453; H04W 72/046; H04B 17/101; H04B 7/0617
(Continued)

(56) References Cited

U.S. PATENT DOCUMENTS 11,044,650 B2 * 6/2021 Chen ................ H04W 36/0085
2004/0235527 A1 * 11/2004 Reudink ............... H04W 16/02
455/561
(Continued)

FOREIGN PATENT DOCUMENTS

CN    103039028 A    4/2013
CN    104521155 A    4/2015
(Continued)

OTHER PUBLICATIONS

R1-1701714.pdf (Year: 2017).*
(Continued)

*Primary Examiner* — Intekhaab A Siddiquee
(74) *Attorney, Agent, or Firm* — Baker Botts, LLP

(57) ABSTRACT

According to certain embodiments, a method is disclosed for use in a network node. The method comprises determining at least one parameter N per carrier frequency. The parameter N indicates a maximum number of beams to be used by a wireless device for signal measurements in a cell. The method comprises communicating the parameter(s) N to the wireless device.

26 Claims, 26 Drawing Sheets

(51) Int. Cl.
*H04B 17/10* (2015.01)
*H04W 56/00* (2009.01)
*H04W 72/04* (2009.01)

(52) U.S. Cl.
CPC ....... *H04W 56/001* (2013.01); *H04W 72/046* (2013.01); *H04W 72/0453* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 2013/0155891 | A1* | 6/2013 | Dinan | H04L 27/2646 370/252 |
| 2014/0213249 | A1 | 7/2014 | Kang et al. | |
| 2015/0358094 | A1 | 12/2015 | Yi et al. | |
| 2017/0311252 | A1 | 10/2017 | Takano | |

FOREIGN PATENT DOCUMENTS

| | | |
|---|---|---|
| CN | 105210441 A | 12/2018 |
| JP | 2016143916 A | 8/2016 |
| KR | 10-2016-0143509 A | 12/2016 |
| RU | 2 608 538 C1 | 1/2014 |
| WO | 2019 097020 A1 | 5/2019 |

OTHER PUBLICATIONS

R1-1703162.pdf (Year: 2017).*
R2-1701713.pdf (Year: 2017).*
R1-1702955.pdf (Year: 2017).*
RP-170377 38802-200.pdf (Year: 2017).*
36331-e00.pdf (Year: 2016).*
R2-1701812 (Year: 2017).*
62475360 P (Year: 2017).*
Office Action issued by the Russian Federal for Application No. 201933578 (PCT/IB2017/058313) (English translation attached)—dated Jan. 29, 2020.
Communication Pursuant To Article 94(3) EPC issued for Application No. 20 153 486.4 -1220—dated Jul. 15, 2020.
3GPP TSG-RAN WG1#88; Athens, Greece; Source: Nokia, Alcatel-Lucent Shanghai Bell; Title: Beam Management—Beam Reporting (R1-1703162)—Feb. 13-17, 2017.
3GPP TSG-RAN WG2 #AdHoc Meeting; Qingdao, China; Source: Intel; Title: Report of email discussion [98#32] [NR] Measurement report content (Intel) (R2-1707013)—Jun. 27-29, 2017.
3GPP TSG-RAN WG2 #99; Berlin, Germany; Source: CATT; Title: Configurations for cell quality derivation and beam Yeporting (R2-1707902, Revision of R2-1706401)—Aug. 21-25, 2017.
Invitation To Respond To Written Opinion issued by the Intellectual Property Office of Singapore for Patent Application No. 11201908069R—dated Oct. 5, 2020.
PCT International Search Report for International application No. PCT/IB2017/058313—dated Oct. 31, 2018.
PCT Written Opinion of the International Searching Authority for International application No. PCT/IB2017/058313—dated Oct. 31, 2018.
Extended European Search Report issued for Application No. / Patent No. 20153486.4-1220—dated Mar. 6, 2020.
Canadian Office Action issued for Application No. 3,054,655—dated Sep. 25, 2020.
JP Office Action for Patent Application No. 2019-550218 dated Jan. 4, 2021.
European Patent Office, Communication pursuant to Article 94(3) EPC, Application No. 20153486.4, dated Mar. 23, 2021, 5 pages.
Examination Report issued by the Government of India, Intellectual Property India for Application No. 201947042247—dated Oct. 4, 2021.
CA Examination Report Re: Application No. 3,054,655 dated Jul. 16, 2021.
Office Action in Chinese Application No. 201780088861.1 dated Jun. 22, 2021.
Notice of Allowance in Japanese Application No. 2019-550218 dated Sep. 27, 2021.

* cited by examiner

CELL QUALITY DERIVATION CONFIGURATION

PRIORITY

This nonprovisional application is a U.S. National Stage Filing under 35 U.S.C. § 371 of International Patent Application Serial No. PCT/IB2017/058313 filed Dec. 21, 2017 and entitled "Cell Quality Derivation Configuration" which claims priority to U.S. Provisional Patent Application No. 62/476,536 filed Mar. 24, 2017 both of which are hereby incorporated by reference in their entirety.

TECHNICAL FIELD

Certain embodiments of the present disclosure relate, in general, to wireless networks and, more particularly, to cell quality derivation configuration.

BACKGROUND

The Third Generation Partnership Project (3GPP) is discussing multi-antenna schemes for New Radio (NR). For NR, frequency ranges up to 100 GHz are considered. It is known that high-frequency radio communication above 6 GHz suffers from significant path loss and penetration loss. One solution to address this issue is to deploy large-scale antenna arrays to achieve high beamforming gain, which is a reasonable solution due to the small wavelength of high-frequency signal. Therefore multiple input multiple output (MIMO) schemes for NR are also called massive MIMO. For around 30/70 GHz, up to 256 transmit (Tx) and receive (Rx) antenna elements are assumed. Extension to support 1024 Tx at 70 GHz is agreed and it is under discussion for 30 GHz. For sub-6 GHz communication, there is also a trend to increase the number of antenna elements to obtain more beamforming and multiplexing gain.

Beamforming Approaches

With massive MIMO, three approaches to beamforming have been discussed: analog, digital, and hybrid (a combination of analog and digital). The analog beamforming would compensate high pathloss in NR scenarios, while digital precoding would provide additional performance gains similar to MIMO for sub-6 GHz necessary to achieve a reasonable coverage. The implementation complexity of analog beamforming is significantly less than digital precoding since in many implementations it relies on simple phase shifters, but the drawbacks are its limitation in multi-direction flexibility (i.e., a single beam can be formed at a time and the beams are then switched in time domain), only wideband transmissions (i.e., not possible to transmit over a subband), unavoidable inaccuracies in the analog domain, etc. Digital beamforming (requiring costly converters to/from the digital domain from/to IF domain), used today in LTE, provides the best performance in terms of data rate and multiplexing capabilities (multiple beams over multiple sub-bands at a time can be formed), but at the same time it is challenging in terms of power consumption, integration, and cost; in addition to that the gains do not scale linearly with the number of transmit/receive units while the cost is growing rapidly. Supporting hybrid beamforming, to benefit from cost-efficient analog beamforming and high-capacity digital beamforming, is therefore desirable for NR. An example diagram for hybrid beamforming is shown in FIG. 1. Beamforming can be on transmission beams and/or reception beams on the network side or the wireless device side.

Beam Sweeping

The analog beam of a subarray can be steered toward a single direction on each Orthogonal Frequency Division Multiplexing (OFDM) symbol, and hence the number of subarrays determines the number of beam directions and the corresponding coverage on each OFDM symbol. However, the number of beams to cover the whole serving area is typically larger than the number of subarrays, especially when the individual beam-width is narrow. Therefore, to cover the whole serving area, multiple transmissions with narrow beams differently steered in time domain are also likely to be needed. The provision of multiple narrow coverage beams for this purpose has been called "beam sweeping." For analog and hybrid beamforming, the beam sweeping seems to be essential to provide the basic coverage in NR. For this purpose, multiple OFDM symbols, in which differently steered beams can be transmitted through subarrays, can be assigned and periodically transmitted. Examples of beam sweeping are illustrated in FIG. 2 (Tx beam sweeping on two subarrays) and FIG. 3 (Tx beam sweeping on three subarrays).

Configuration of Synchronization Signal (SS) Block

The following describes a non-limiting example of SS block and SS burst configuration which may be assumed in other embodiments.

SS Block:

an SS block can be used to transmit a new radio primary synchronization signal (NR-PSS), new radio secondary synchronization signal (NR-SSS), and/or new radio physical broadcast channel (NR-PBCH). For a given frequency band, an SS block corresponds to a number (N) of OFDM symbols based on the default subcarrier spacing, and N is a constant. A wireless device shall be able to identify at least OFDM symbol index, slot index in a radio frame, and radio frame number from an SS block. A single set of possible SS block time locations (e.g., with respect to radio frame or with respect to SS burst set) is specified per frequency band. At least for multi-beams case, at least the time index of SS-block is indicated to the wireless device. A wireless device can be informed of the position(s) of actual transmitted SS-blocks in order to help the wireless device to perform CONNECTED/IDLE mode measurements, to receive downlink (DL) data/control in unused SS blocks when in CONNECTED mode, and potentially to receive DL data/control in unused SS-blocks when in IDLE mode.

SS Burst:

One or multiple SS block(s) compose an SS burst. The maximum number of SS-blocks, L, within SS burst set may be carrier frequency dependent. For example, for frequency range category #A (e.g., 0~6 GHz), the number (L) is TBD within L≤[16]. For frequency range category #B (e.g., 6~60 GHz), the number is TBD within L≤[128].

SS Burst Set:

One or multiple SS burst(s) further compose an SS burst set (or series) where the number of SS bursts within a SS burst set is finite. From physical layer specification perspective, at least one periodicity of SS burst set is supported. From the perspective of the wireless device, SS burst set transmission is periodic. At least for initial cell selection, the wireless device may assume a default periodicity of SS burst set transmission for a given carrier frequency (e.g., one of 5 ms, 10 ms, 20 ms, 40 ms, 80 ms, or 160 ms). The wireless device may assume that a given SS block is repeated with a SS burst set periodicity. By default, the wireless device may neither assume the base station (e.g., the gNB in NR)

transmits the same number of physical beam(s), nor the same physical beam(s) across different SS-blocks within an SS burst set.

For each carrier, the SS blocks may be time-aligned or overlap fully or at least in part, or the beginning of the SS blocks may be time-aligned (e.g., when the actual number of transmitted SS blocks is different in different cells).

An example configuration of SS blocks, SS bursts, and SS burst sets/series is illustrated in FIG. 4.

Mobility Procedure

In LTE, handover decisions at a serving eNodeB (eNB) are taken based on events configured at the wireless device based on the radio quality of different cells. These measurements are performed based on cell-specific reference signals (CRS) so that a cell quality is derived.

In LTE, the wireless device uses CRS and synchronization signals (PSS/SSS) to discover a cell and perform radio resource management (RRM) measurements to derive a cell quality. For both intra- and inter-frequency measurements, the wireless device is expected to fulfill certain RRM requirements depending on channel conditions and noise levels. To do that, the wireless device typically collects periodic snapshots (e.g., at every 40 ms) based on CRS (after cell detection) where coherent and non-coherent averages are performed per sample in a limited bandwidth. The wireless device performs filtering at the physical layer before reporting the measurement results to higher layers. Every time a measurement result is received by the higher layers, the wireless device performs layer 3 (L3) filtering. In LTE, the standardized L3 filtering provides some level of harmonization among wireless devices. However, the parameters of the layer 1 (L1) filtering are not standardized and are left to wireless device implementation.

Observation 1: In LTE the L3 filtering is standardized, therefore the network can provide a level of harmonization among UEs as well as different cell quality measurements of a UE.

The LTE filtering model, as captured in TS 36.300, is reproduced in FIG. 5.

SUMMARY

Certain problems can occur in existing systems, as further explained in this section. In 3GPP, the RAN1 terminology assumed that at least the combination of NR synchronization sequences (NR-PSS/NR-SSS) and PBCH constitutes a so-called SS Block. That may also contain a Tertiary Sync Sequence (TSS) to indicate the OFDM symbol timing or equivalent information, but this is still for future study (FFS) in RAN1. An RRC_CONNECTED wireless device trying to access a target cell should assume that the SS Block may be transmitted in the form of repetitive bursts of SS Block transmissions (denoted "SS Burst"), wherein such a burst consists of a number of SS Block transmissions following close after each other in time. Furthermore, a set of SS Bursts may be grouped together (denoted "SS Burst Set"), where the SS Bursts in the SS Burst Sets are assumed to have some relation to each other. Both SS Bursts and SS Burst Sets have their respective given periodicity. In the single beam scenarios, the network could configure time-repetition within one SS Burst in a wide beam.

FIG. 6 illustrates examples of different configurations of an SS Burst Set. The top example illustrates time-repetition within one SS Burst in a wide beam. The middle example illustrates beam-sweeping of a small number of beams using only one SS Burst in the SS Burst Set. The bottom example illustrates beam-sweeping of a larger number of beams using more than one SS Burst in the SS Burst Set to form a complete sweep.

The network vendor may choose which of these three alternatives to implement. That choice depends on the tradeoff between i) the overhead caused by transmitting periodic and always on narrow beam sweepings vs. ii) the delays and signaling needed to configure the wireless device to find a narrow beam for PDSCH/PDCCH. The implementation shown in the top example in FIG. 6 prioritizes i), while the implementation shown in the bottom example in FIG. 6 prioritizes ii). The middle example in FIG. 6 is an intermediate case, where a sweeping of wide beams is used. In that case the number of beams to cover the cell is reduced, but in some cases an additional refinement is needed for narrow gain beamforming of the physical downlink shared channel (PDSCH).

Regardless of which of these is implemented in each cell, the wireless device should be able to perform cell based measurements when SS Block signals are being beamformed. According to the latest RAN2 agreements from RAN2#97 meeting in Athens, cell quality derivation can be derived from multiple beams and the following has been agreed:

Agreement

1 Cell quality can be derived from N best beams where value of N can be configured to 1 or more than 1.

FFS: Details of filtering to be applied

FFS: How the quality of the serving cell is determined (e.g., from serving beam only or cell quality)

FFS: Whether the agreement applies to both additional RS and idle RS.

FFS: Whether to only consider beams above a threshold ('good' beams)

A problem that arises is that each implementation may have a different number of beams K (i.e., SS Block Set), and that may affect the way the network should optimally configure the parameter N (i.e., number of good beams to be used to perform cell quality derivation). Since N relates to cell quality, a solution could be to always configure the wireless device with N per potential neighbor cell candidate in the measurement configuration. However, that would require the network to always be aware of the best beams. That would also disable the possibility that a wireless device finds new cells not in the configure list of cells and, without an N, the wireless device would not be instructed to perform cell quality derivation. In addition, it has also been agreed in RAN2 that the amount of configuration should be minimized. Another possibility would be to enable each cell to broadcast its N parameter. However, the wireless device would have to be forced to read system information for every single cell it detects.

Certain embodiments of the present disclosure may provide solutions to the above-described problems. In general, certain embodiments configure the parameter N used in multi-beam cell scenarios to define the number of beams the wireless device should consider to derive the cell quality. The configuration is at least per carrier frequency to minimize the amount of needed configuration and required inter-node coordination.

According to certain embodiments, a method is disclosed for use in a network node. The method comprises determining at least one parameter N per carrier frequency. The parameter N indicates a maximum number of beams to be used by a wireless device for signal measurements in a cell. The method comprises communicating the parameter(s) N to the wireless device.

In some embodiments, the method comprises communicating one or more indicator(s) to the wireless device. Examples of indicators include an indicator indicating that all carrier frequencies use the same parameter N, an indicator indicating a set of carrier frequencies that use the same parameter N, an indicator indicating whether all cells in a group of cells belonging to a particular carrier frequency have the same number of beams, and an indicator indicating whether the number of beams on cells belonging to a first carrier frequency is the same as the number of beams on cells belonging to a second carrier frequency.

In some embodiments, communicating the parameter(s) N to the wireless device comprises communicating a first parameter N1 and information associating the first parameter N1 with a first carrier frequency, and communicating a second parameter N2 and information associating the second parameter N2 with a second carrier frequency that is different than the first carrier frequency. In some embodiments the information associating the first parameter N1 with the first carrier frequency comprises a frequency channel number of the first carrier frequency. In some embodiments, the information associating the second parameter N2 with the second carrier frequency comprises a frequency channel number of the second carrier frequency.

In some embodiments, the signal measurements comprise at least one of the following types of signal measurements: measurements of cell specific reference signals, measurements of synchronization signals, or radio resource management (RRM) measurements.

In some embodiments, the at least one parameter N per carrier frequency comprises a first parameter N1 for performing a first type of signal measurements on a first carrier frequency and a second parameter N2 for performing a second type of signal measurements on the first carrier frequency. The second type of signal measurements is different than the first type of signal measurements. For example, in some embodiments, the first parameter N1 is used for performing measurements of synchronization signals and the second parameter N2 is used for performing measurements of cell specific reference signals. In some embodiments, the at least one parameter N per carrier frequency is communicated in system information common for all wireless devices.

In some embodiments, the at least one parameter N per carrier frequency is communicated in dedicated signaling to the wireless device.

In some embodiments, the method further comprises sending the wireless device one or more cell-specific offsets. Each cell-specific offset is associated with a specific cell such that the wireless device adjusts the value of the at least one parameter N according to the cell-specific offset when performing the signal measurements of the specific cell. At least one cell-specific offset can be associated with a serving cell of the network node. At least one cell-specific offset can be associated with a neighbor cell of another network node. One or more cell-specific offsets can be configured per carrier frequency. In some embodiments, a cell-specific offset of a new cell can be received from the wireless device.

In some embodiments, the method further comprises determining a UE-specific offset. The UE-specific offset is determined based on the beamforming capabilities of the wireless device. The method comprises sending the wireless device the UE-specific offset such that the wireless device adjusts the value of the at least one parameter N according to the UE-specific offset.

In some embodiments, the method further comprises receiving information about cell-specific offsets for parameter N in different carrier frequencies. The information is received from one or more other network nodes. The method comprises using the received information when determining at least one parameter N per carrier frequency.

In some embodiments, the method further comprises receiving, from one or more other network nodes, information about a number of beams each network node's respective cell uses for a particular carrier frequency. The method comprises using the received information and information about the number of beams used in the network node's own cell for the particular carrier frequency to determine a common parameter N for all cells on the particular carrier frequency.

In some embodiments, the method further comprises receiving, from one or more other network nodes, information about the parameter N that each network node's respective cell uses for a particular carrier frequency. The method comprises using the received information and information about the parameter N used in the network node's own cell for the particular carrier frequency to determine a common parameter N for all cells on the particular carrier frequency. In some embodiments, the common parameter N is determined based the maximum parameter N used by the network node or any of the other network nodes, the minimum parameter N used by the network node or any of the other network nodes, the average of parameters N used by the network node and the other network nodes, or the Xth percentile of parameters N used by the network node and the other network nodes.

In some embodiments, the network node comprises the serving cell.

In some embodiments, the parameter N facilitates signal measurements performed by the wireless device on each cell belonging to the same carrier frequency.

In some embodiments, the parameter N facilitates signal measurements performed by the wireless device in a multi-beam cell.

In some embodiments, the N parameter(s) are signaled from the network node to the wireless device in a measurement object (MeasObject) information element.

According to certain embodiments, a computer program product is disclosed. The computer program product comprises a non-transitory computer readable storage medium having computer readable program code embodied in the medium. The computer readable code, when executed by processing circuitry of a network node, causes the network node to perform operations. The operations comprise determining at least one parameter N per carrier frequency. The parameter N indicates a maximum number of beams to be used by a wireless device for signal measurements in a cell. The operations comprise communicating the parameter(s) N to the wireless device. In some embodiments, the computer readable code, when executed by the processing circuitry of the network node, further causes the network node to perform any of the above-described methods for use in a network node.

According to certain embodiments, a network node is disclosed. The network node comprises processing circuitry and a wireless interface. The processing circuitry is operable to determine at least one parameter N per carrier frequency. The parameter N indicates a maximum number of beams to be used by a wireless device for signal measurements in a cell. The wireless interface is operable to communicate the parameter(s) N to the wireless device.

In some embodiments, the processing circuitry is further operable to configure one or more indicators, and the wireless interface is further operable to communicate the indicator(s) to the wireless device. Examples of indicators include an indicator indicating that all carrier frequencies use the same parameter N, an indicator indicating a set of carrier frequencies that use the same parameter N, an indicator indicating whether all cells in a group of cells belonging to a particular carrier frequency have the same number of beams, and an indicator indicating whether the number of beams on cells belonging to a first carrier frequency is the same as the number of beams on cells belonging to a second carrier frequency.

In some embodiments, the processing circuitry is operable to determine a first parameter N1 and information associating the first parameter N1 with a first carrier frequency, and to determine a second parameter N2 and information associating the second parameter N2 with a second carrier frequency that is different than the first carrier frequency. The wireless interface is operable to communicate the first parameter N1 and the second parameter N2 to the wireless device. In some embodiments the information associating the first parameter N1 with the first carrier frequency comprises a frequency channel number of the first carrier frequency. In some embodiments, the information associating the second parameter N2 with the second carrier frequency comprises a frequency channel number of the second carrier frequency.

In some embodiments, the signal measurements comprise at least one of the following types of signal measurements: measurements of cell specific reference signals, measurements of synchronization signals, or radio resource management (RRM) measurements.

In some embodiments, the at least one parameter N per carrier frequency comprises a first parameter N1 for performing a first type of signal measurements on a first carrier frequency and a second parameter N2 for performing a second type of signal measurements on the first carrier frequency. The second type of signal measurements is different than the first type of signal measurements. For example, in some embodiments, the first parameter N1 is used for performing measurements of synchronization signals and the second parameter N2 is used for performing measurements of cell specific reference signals.

In some embodiments, the wireless interface is operable to communicate the at least one parameter N per carrier frequency in system information common for all wireless devices.

In some embodiments, the wireless interface is operable to communicate the at least one parameter N per carrier frequency in dedicated signaling to the wireless device.

In some embodiments, the processing circuitry is further operable to determine one or more cell-specific offsets. Each cell-specific offset is associated with a specific cell such that the wireless device adjusts the value of the at least one parameter N according to the cell-specific offset when performing the signal measurements of the specific cell. The wireless interface is further operable to send the one or more cell-specific offsets to the wireless device. At least one cell-specific offset can be associated with a serving cell of the network node. At least one cell-specific offset can be associated with a neighbor cell of another network node. One or more cell-specific offsets can be configured per carrier frequency. In some embodiments, a cell-specific offset of a new cell can be received from the wireless device.

In some embodiments, the processing circuitry is further operable to determine a UE-specific offset. The UE-specific offset is determined based on the beamforming capabilities of the wireless device. The wireless interface is further operable to send the wireless device the UE-specific offset such that the wireless device adjusts the value of the at least one parameter N according to the UE-specific offset.

In some embodiments, the network node further comprises a network interface. The network interface is operable to receive, from one or more other network nodes, information about cell-specific offsets for parameter N in different carrier frequencies. The processing circuitry is further operable to use the received information when determining at least one parameter N per carrier frequency.

In some embodiments, the network interface is operable to receive, from one or more other network nodes, information about a number of beams each network node's respective cell uses for a particular carrier frequency. The processing circuitry is further operable to use the received information and information about the number of beams used in the network node's own cell for the particular carrier frequency to determine a common parameter N for all cells on the particular carrier frequency.

In some embodiments, the network interface is operable to receive, from one or more other network nodes, information about the parameter N that each network node's respective cell uses for a particular carrier frequency. The processing circuitry is further operable to use the received information and information about the parameter N used in the network node's own cell for the particular carrier frequency to determine a common parameter N for all cells on the particular carrier frequency. In some embodiments, the common parameter N is determined based the maximum parameter N used by the network node or any of the other network nodes, the minimum parameter N used by the network node or any of the other network nodes, the average of parameters N used by the network node and the other network nodes, or the Xth percentile of parameters N used by the network node and the other network nodes.

In some embodiments, the network node comprises the serving cell.

In some embodiments, the parameter N facilitates signal measurements performed by the wireless device on each cell belonging to the same carrier frequency.

In some embodiments, the parameter N facilitates signal measurements performed by the wireless device in a multi-beam cell.

In some embodiments, the N parameter(s) are signaled from the network node to the wireless device in a measurement object (MeasObject) information element.

According to certain embodiments, a method is disclosed for use in a wireless device. The method comprise receiving at least one parameter N per carrier frequency from a network node. The parameter N indicates a maximum number of beams to be used by the wireless device for signal measurements in a cell. The method comprises using the at least one parameter N.

In some embodiments, the method further comprises receiving one or more indicators. Examples of indicators include an indicator indicating that all carrier frequencies use the same parameter N, an indicator indicating a set of carrier frequencies that use the same parameter N, an indicator indicating whether all cells in a group of cells belonging to a particular carrier frequency have the same number of beams, and an indicator indicating whether the number of beams on cells belonging to a first carrier frequency is the same as the number of beams on cells belonging to a second carrier frequency.

In some embodiments, in response to the indicator indicating that all cells in the group have the same number of beams, the method further comprises detecting the number of beams on the particular carrier frequency for any one cell in the group and assuming that the other cells in the group have the same number of beams on the particular carrier frequency.

In some embodiments, in response to the indicator indicating that the cells in the group do not all have the same number of beams, the method further comprises detecting the number of beams on the particular carrier frequency on a per-cell basis by reading system information from the respective cell.

In some embodiments, in response to the indicator indicating that the number of beams on cells belonging to the first carrier frequency is the same as the number of beams on cells belonging to the second carrier frequency, the method further comprises detecting the number of beams on the first carrier frequency and assuming that the second carrier frequency has the same number of beams.

In some embodiments, in response to the indicator indicating that the number of beams on cells belonging to the first carrier frequency is not the same as the number of beams on cells belonging to the second carrier frequency, the method further comprises detecting the number of beams on the first carrier frequency and detecting the number of beams on the second carrier frequency.

In some embodiments, the method comprises receiving a first parameter N1 and information associating the first parameter N1 with a first carrier frequency, and receiving a second parameter N2 and information associating the second parameter N2 with a second carrier frequency that is different than the first carrier frequency. In some embodiments the information associating the first parameter N1 with the first carrier frequency comprises a frequency channel number of the first carrier frequency. In some embodiments, the information associating the second parameter N2 with the second carrier frequency comprises a frequency channel number of the second carrier frequency.

In some embodiments, using the at least one parameter N comprises, for each of one or more carrier frequencies on which the signal measurements are to be performed, using a parameter N that corresponds to the carrier frequency to determine the maximum number of beams to be used for the signal measurements in the cell. The method comprises performing the signal measurements on up to the maximum number of beams in the cell. In some embodiments, the method further comprises performing the signal measurements on up to the maximum number of beams in a second cell.

In some embodiments, the method further comprises deriving a signal quality and/or a signal strength of the cell based on the signal measurements.

In some embodiments, the signal measurements comprise at least one of the following types of signal measurements: measurements of cell specific reference signals, measurements of synchronization signals, or radio resource management (RRM) measurements.

In some embodiments, the at least one parameter N per carrier frequency comprises a first parameter N1 for performing a first type of signal measurements on a first carrier frequency and a second parameter N2 for performing a second type of signal measurements on the first carrier frequency. The second type of signal measurements is different than the first type of signal measurements. For example, in some embodiments, the first parameter N1 is used for performing measurements of synchronization signals and the second parameter N2 is used for performing measurements of cell specific reference signals.

In some embodiments, the method further comprises using the signal measurements for one or more of the following tasks: reporting to the network node, reporting to a neighboring network node, reporting to another wireless device, changing a cell, positioning the wireless device, performing minimization of drive test, and/or performing power control.

In some embodiments, the at least one parameter N per carrier frequency is received in system information common for all wireless devices.

In some embodiments, the at least one parameter N per carrier frequency is received in dedicated signaling to the wireless device.

In some embodiments, the method further comprises configuring the wireless device with one or more cell-specific offsets. Each cell-specific offset is associated with a specific cell such that the wireless device adjusts the value of the at least one parameter N according to the cell-specific offset when performing the signal measurements of the specific cell. At least one cell-specific offset can be associated with a serving cell of the network node. At least one cell-specific offset can be associated with a neighbor cell of another network node. The cell-specific offset associated with the neighbor cell can be received from the serving cell. One or more cell-specific offsets can be configured per carrier frequency.

In some embodiments, the method further comprises detecting the cell-specific offset of a new cell and reporting the cell-specific offset of the new cell to the serving cell.

In some embodiments, the method further comprises configuring the wireless device with a UE-specific offset associated with the particular wireless device such that the wireless device adjusts the value of the at least one parameter N according to the UE-specific offset. In some embodiments, the method determines the UE-specific offset based on the beamforming capabilities of the wireless device. In some embodiments, the UE-specific offset is received from the network node.

In some embodiments, the network node comprises the serving cell.

In some embodiments, the parameter N is used by the wireless device for signal measurements on each cell belonging to the same carrier frequency.

In some embodiments, the signal measurements are performed by the wireless device in a multi-beam cell.

In some embodiments, the N parameter(s) are received from the network node by the wireless device in a measurement object (MeasObject) information element.

According to certain embodiments, a computer program product is disclosed. The computer program product comprises a non-transitory computer readable storage medium having computer readable program code embodied in the medium. The computer readable code, when executed by processing circuitry of a wireless device, causes the network node to perform operations. The operations comprise receiving, from a network node, at least one parameter N per carrier frequency from a network node, and using the at least one parameter N. The parameter N indicates a maximum number of beams to be used by the wireless device for signal measurements in a cell. In some embodiments, the computer readable code, when executed by the processing circuitry of the wireless device, further causes the wireless device to perform any of the above-described methods for use in a wireless device.

According to certain embodiments, a wireless device is disclosed. The wireless device comprises an interface and processing circuitry. The interface is operable to receive, from a network node, at least one parameter N per carrier frequency. The parameter N indicates a maximum number of beams to be used by the wireless device for signal measurements in a cell. The processing circuitry is operable to use the at least one parameter N.

In some embodiments, the processing circuitry is operable to determine the at least one parameter N per carrier frequency based on receiving one parameter N and an indicator indicating that all carrier frequencies use the same parameter N.

In some embodiments, the processing circuitry is operable to determine the at least one parameter N per carrier frequency based on a first parameter N1 and an indicator indicating carrier frequencies that use the first parameter N1.

In some embodiments, the received at least one parameter N per carrier frequency comprises a first parameter N1 and information associating the first parameter N1 with a first carrier frequency, and a second parameter N2 and information associating the second parameter N2 with a second carrier frequency that is different than the first carrier frequency. In some embodiments the information associating the first parameter N1 with the first carrier frequency comprises a frequency channel number of the first carrier frequency. In some embodiments, the information associating the second parameter N2 with the second carrier frequency comprises a frequency channel number of the second carrier frequency.

In some embodiments, the processing circuitry is operable to use a parameter N that corresponds to the carrier frequency to determine the maximum number of beams to be used for the signal measurements in the cell, and to perform the signal measurements on up to the maximum number of beams in the cell.

In some embodiments, the processing circuitry is further operable to perform the signal measurements on up to the maximum number of beams in a second cell.

In some embodiments, the processing circuitry is further operable to derive a signal quality and/or a signal strength of the cell based on the signal measurements.

In some embodiments, the signal measurements comprise at least one of the following types of signal measurements: measurements of cell specific reference signals, measurements of synchronization signals, or radio resource management (RRM) measurements.

In some embodiments, the at least one parameter N per carrier frequency comprises a first parameter N1 for performing a first type of signal measurements on a first carrier frequency and a second parameter N2 for performing a second type of signal measurements on the first carrier frequency. The second type of signal measurements is different than the first type of signal measurements. For example, in some embodiments, the first parameter N1 is used for performing measurements of synchronization signals and the second parameter N2 is used for performing measurements of cell specific reference signals.

In some embodiments, the processing circuitry is further operable to use the signal measurements for one or more of the following tasks: reporting to the network node, reporting to a neighboring network node, reporting to another wireless device, changing a cell, positioning the wireless device, performing minimization of drive test, and/or performing power control.

In some embodiments, the interface is further operable to receive, from the network node, an indicator indicating whether all cells in a group of cells belonging to a particular carrier frequency have the same number of beams. In some embodiments, in response to the indicator indicating that all cells in the group have the same number of beams, the processing circuitry is further operable to detect the number of beams on the particular carrier frequency for any one cell in the group and assuming that the other cells in the group have the same number of beams on the particular carrier frequency. In some embodiments, in response to the indicator indicating that the cells in the group do not all have the same number of beams, the processing circuitry is further operable to detect the number of beams on the particular carrier frequency on a per-cell basis by reading system information from the respective cell.

In some embodiments, the interfaces is further operable to receive, from the network node, an indicator indicating whether the number of beams on cells belonging to a first carrier frequency is the same as the number of beams on cells belonging to a second carrier frequency. In some embodiments, in response to the indicator indicating that the number of beams on cells belonging to the first carrier frequency is the same as the number of beams on cells belonging to the second carrier frequency, the processing circuitry is further operable to detect the number of beams on the first carrier frequency and assume that the second carrier frequency has the same number of beams. In some embodiments, in response to the indicator indicating that the number of beams on cells belonging to the first carrier frequency is not the same as the number of beams on cells belonging to the second carrier frequency, the processing circuitry is further operable to detect the number of beams on the first carrier frequency and detect the number of beams on the second carrier frequency.

In some embodiments, the at least one parameter N per carrier frequency is received in system information common for all wireless devices.

In some embodiments, the at least one parameter N per carrier frequency is received in dedicated signaling to the wireless device.

In some embodiments, the processing circuitry further operable to configure the wireless device with one or more cell-specific offsets. Each cell-specific offset is associated with a specific cell such that the wireless device adjusts the value of the at least one parameter N according to the cell-specific offset when performing the signal measurements of the specific cell. At least one cell-specific offset can be associated with a serving cell of the network node. At least one cell-specific offset can be associated with a neighbor cell of another network node. The cell-specific offset associated with the neighbor cell can be received from the serving cell. One or more cell-specific offsets can be configured per carrier frequency.

In some embodiments, the processing circuitry is further operable to detect the cell-specific offset of a new cell and report the cell-specific offset of the new cell to the serving cell.

In some embodiments, the processing circuitry further operable to configure the wireless device with a UE-specific offset. The UE-specific offset is associated with the particular wireless device such that the wireless device adjusts the value of the at least one parameter N according to the UE-specific offset. In some embodiments, the processing circuitry determines the UE-specific offset based on the beamforming capabilities of the wireless device. In some embodiments, the UE-specific offset is received from the network node.

In some embodiments, the network node comprises the serving cell.

In some embodiments, the processing circuitry is operable to use the parameter N for signal measurements on each cell belonging to the same carrier frequency.

In some embodiments, the processing circuitry is operable to perform the signal measurements in a multi-beam cell.

In some embodiments, the N parameter(s) are received from the network node by the wireless device in a measurement object (MeasObject) information element.

Additional Examples are Summarized Below:

In a first set of embodiments, we propose a method, an apparatus, a system, and a computer program product where a wireless device is configured (i.e., signaled) by a network node with at least one parameter N (number of beams to be used by the wireless device for signal measurements (e.g., cell quality derivation) in a multi-beam cell) per carrier frequency associated to cells the wireless device should discover and perform cell based RRM measurements. The method also comprises the possibility that the wireless device is also configured with cell-specific offsets associated to serving and neighbor cells.

In a second set of embodiments, the method, apparatus, system, or computer program product also comprises different network nodes being able to exchange the information about cell-specific offsets for N in the different carriers.

In a third set of embodiments, the method, apparatus, system, or computer program product also comprises different network nodes being able to exchange the information about the number of beams used in their respective cells. For example a first network node (Node1) receives parameters M2 and M3 from second network node (Node2) and third network node (Node3) respectively. M2 and M3 indicates the number of beams used in cell2 and cell3 respectively. Node1 use its own parameter (M1 i.e., number of beams in cell1) as well as M2 and M3 for deriving a common parameter N for all cells on carrier F1. As an example M1, M2 and M3 are associated with the same carrier frequency. Then Node1 transmits N associated with carrier F1 to at least one wireless device in cell1.

In a fourth set of embodiments, the method, apparatus, system, or computer program product also comprises different network nodes being able to exchange the information about the parameter N (number of beams to be used by the wireless device for signal measurements in a multi-beam cell) used for different carriers by each network node. For example a first network node (Node1) receives parameters N2 and N3 from second network node (Node2) and third network node (Node3) and use them for one or more operational tasks, e.g., determining its own parameter (e.g., N1). As an example N1, N2 and N3 associated with the same carrier frequency are signaled by Node1, Node2 and Node3 respectively in their respective cells.

Certain embodiments may provide one or more technical advantages. As an example, a technical advantage of certain embodiments is that the wireless device only requires minimum configuration to be able to derive cell quality in scenarios where cells are transmitting reference signals for discovery in multiple beams. In certain embodiments, neighbor cell knowledge is available so that the network has the possibility to optimize the parameter in a cell-specific offset manner. Certain embodiments may have all, some, or none of these advantages. Other advantages may be apparent to those of ordinary skill in the art.

DETAILED DESCRIPTION

Figure 1:
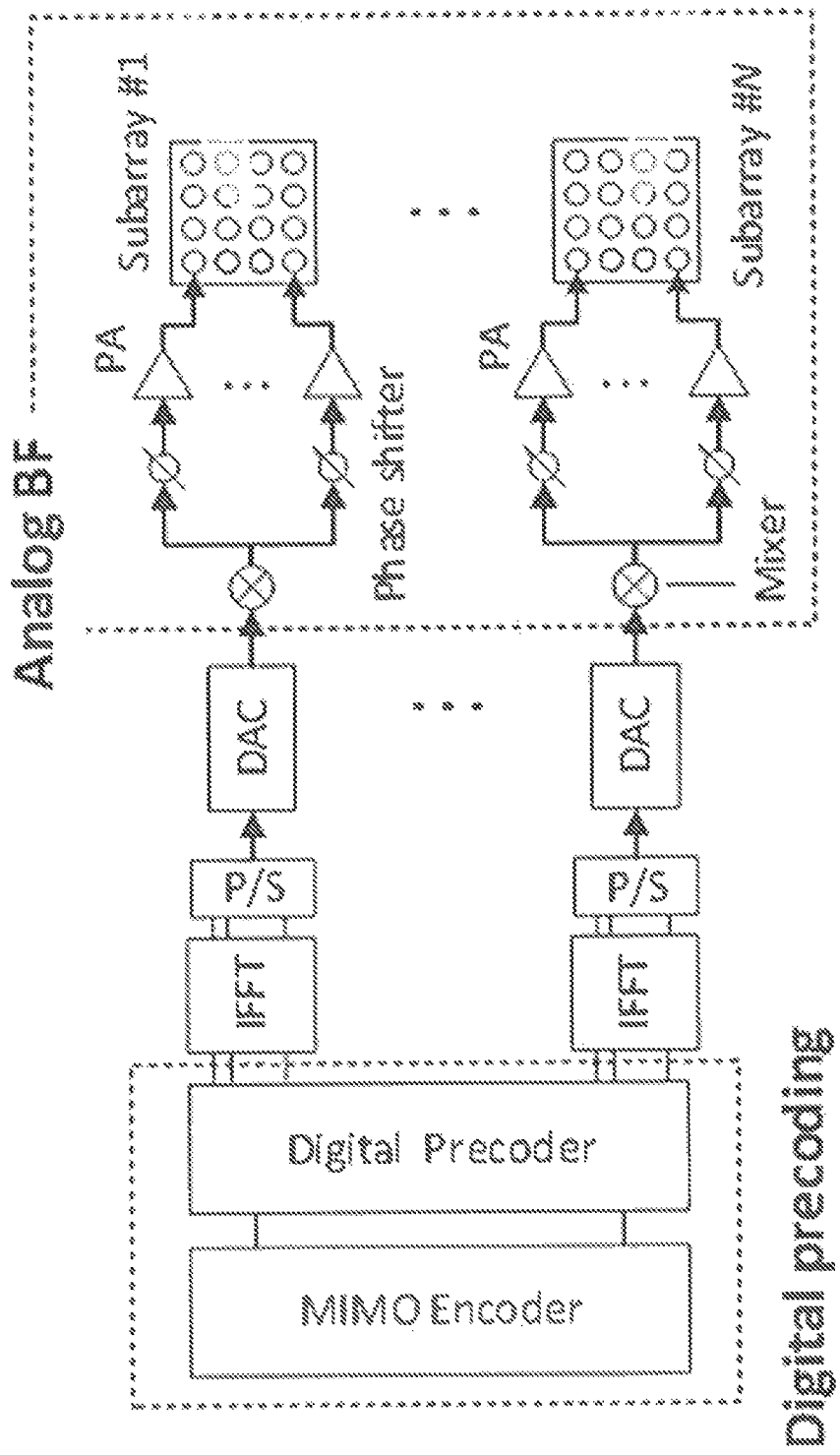
FIG. 1 illustrates an example of hybrid beamforming, in accordance with certain embodiments.
Figure 2:
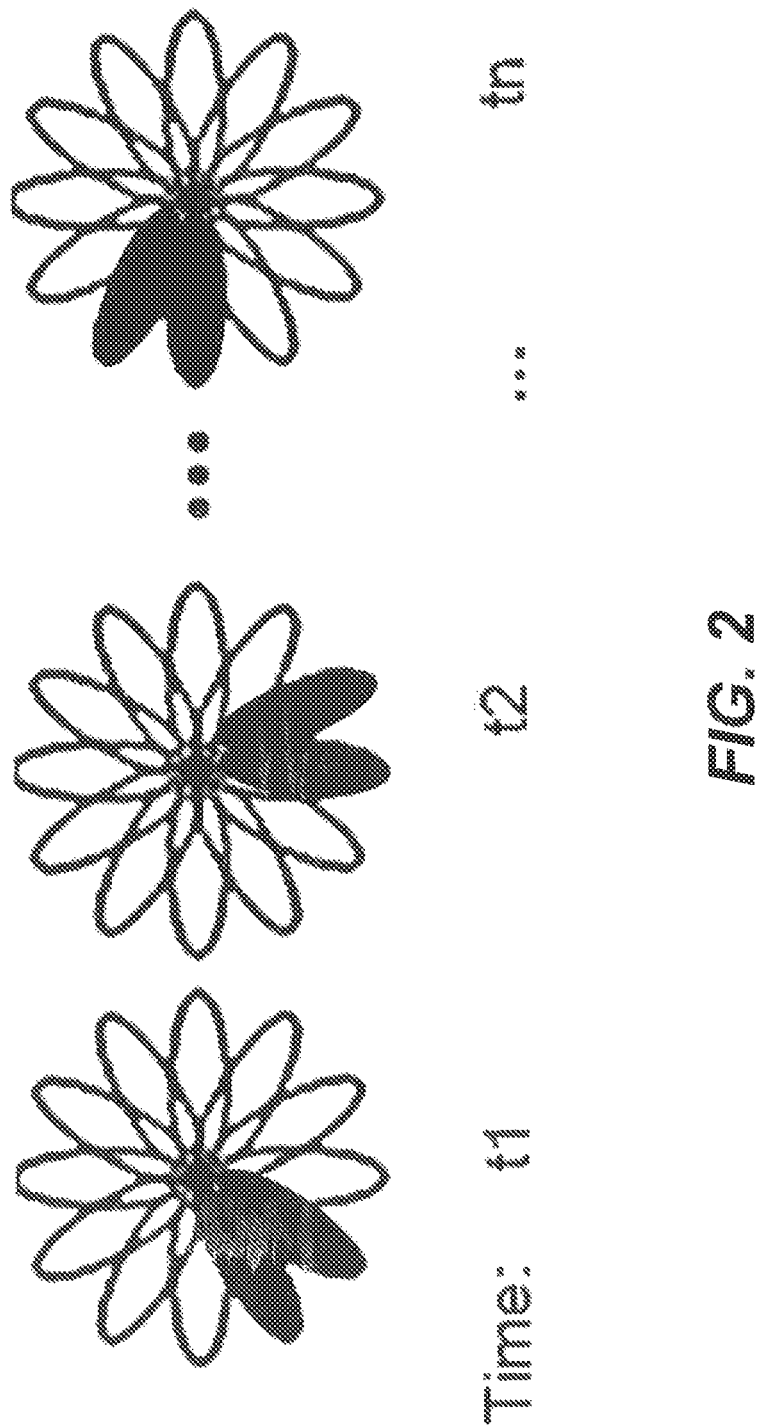
FIG. 2 illustrates an example of transmission beam sweeping on two subarrays, in accordance with certain embodiments.
Figure 3:
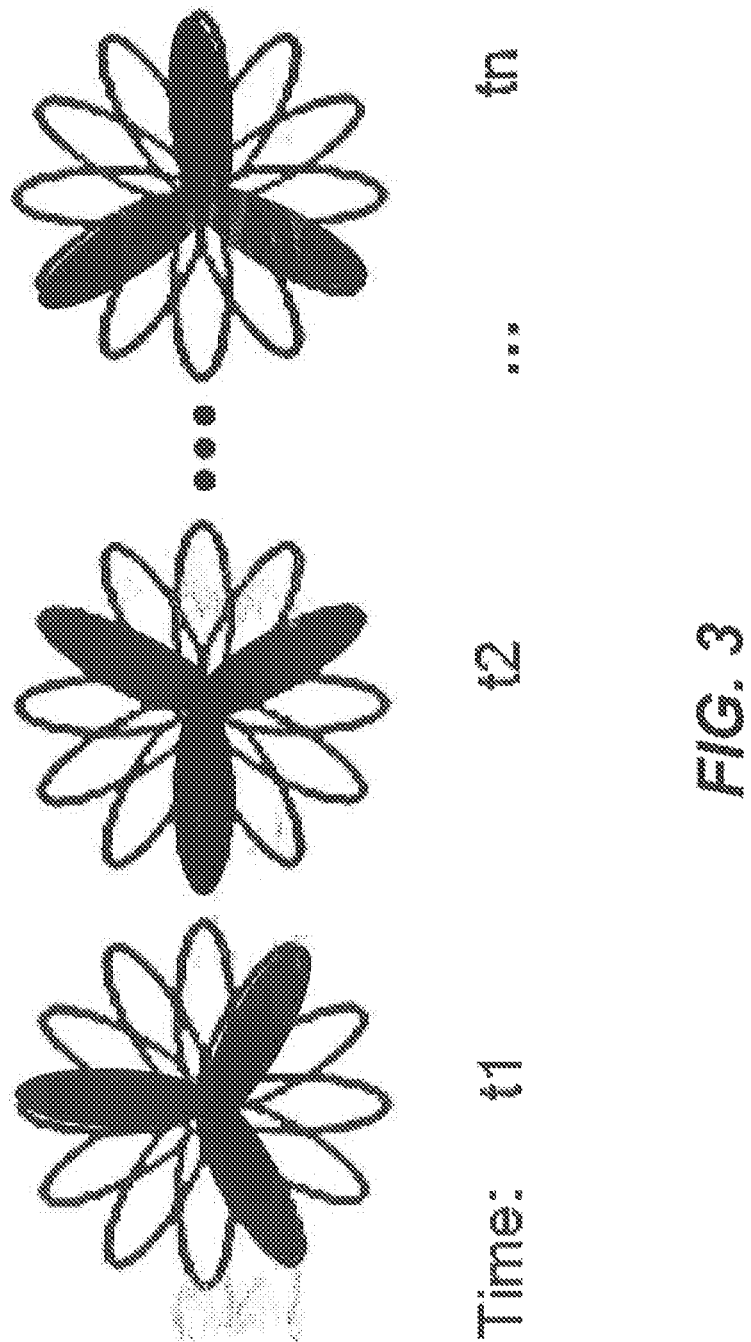
FIG. 3 illustrates an example of transmission beam sweeping on three subarrays, in accordance with certain embodiments.
Figure 4:
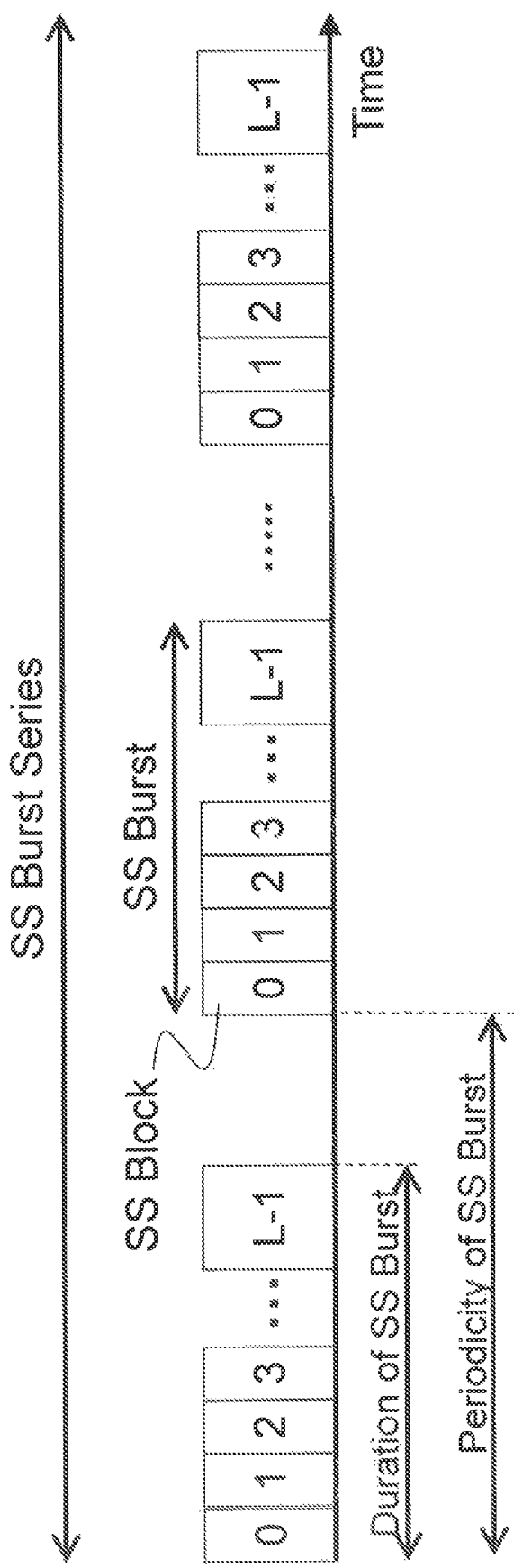
FIG. 4 illustrates an example of configuration of synchronization signal (SS) blocks, SS bursts, and SS burst sets/series, in accordance with certain embodiments.
Figure 5:
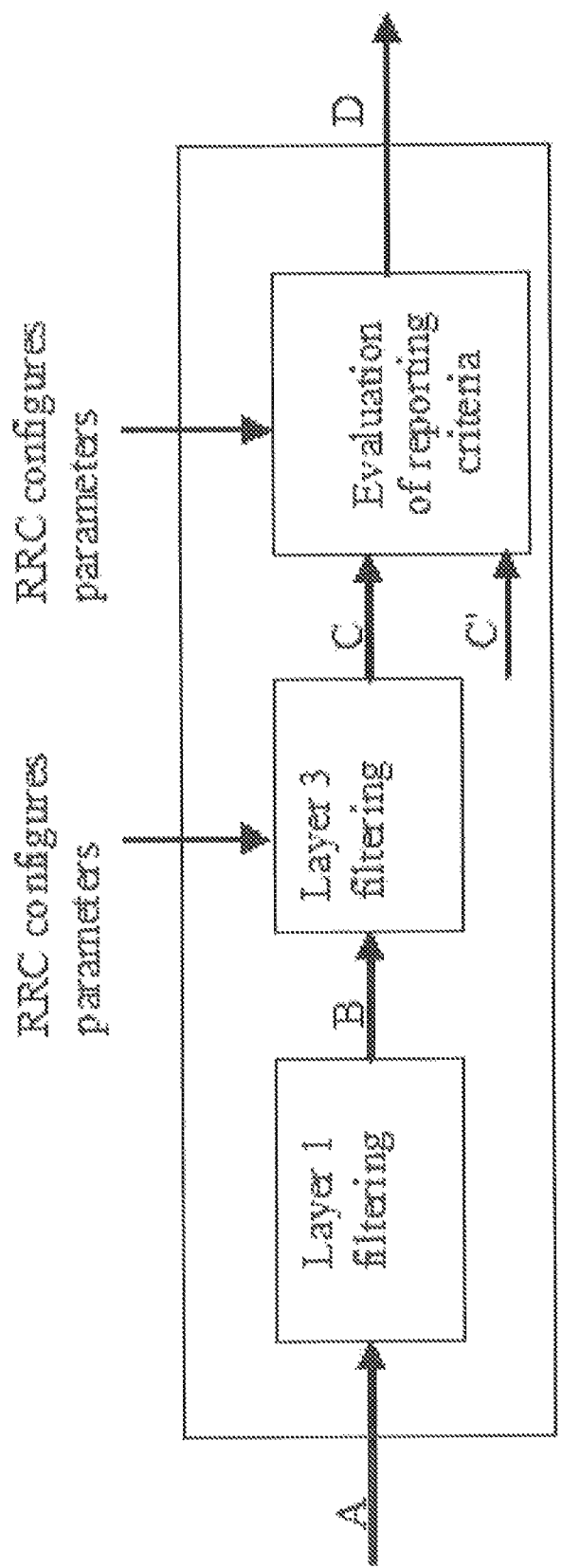
FIG. 5 illustrates an example of a user equipment filtering model in LTE, in accordance with certain embodiments.
Figure 6:
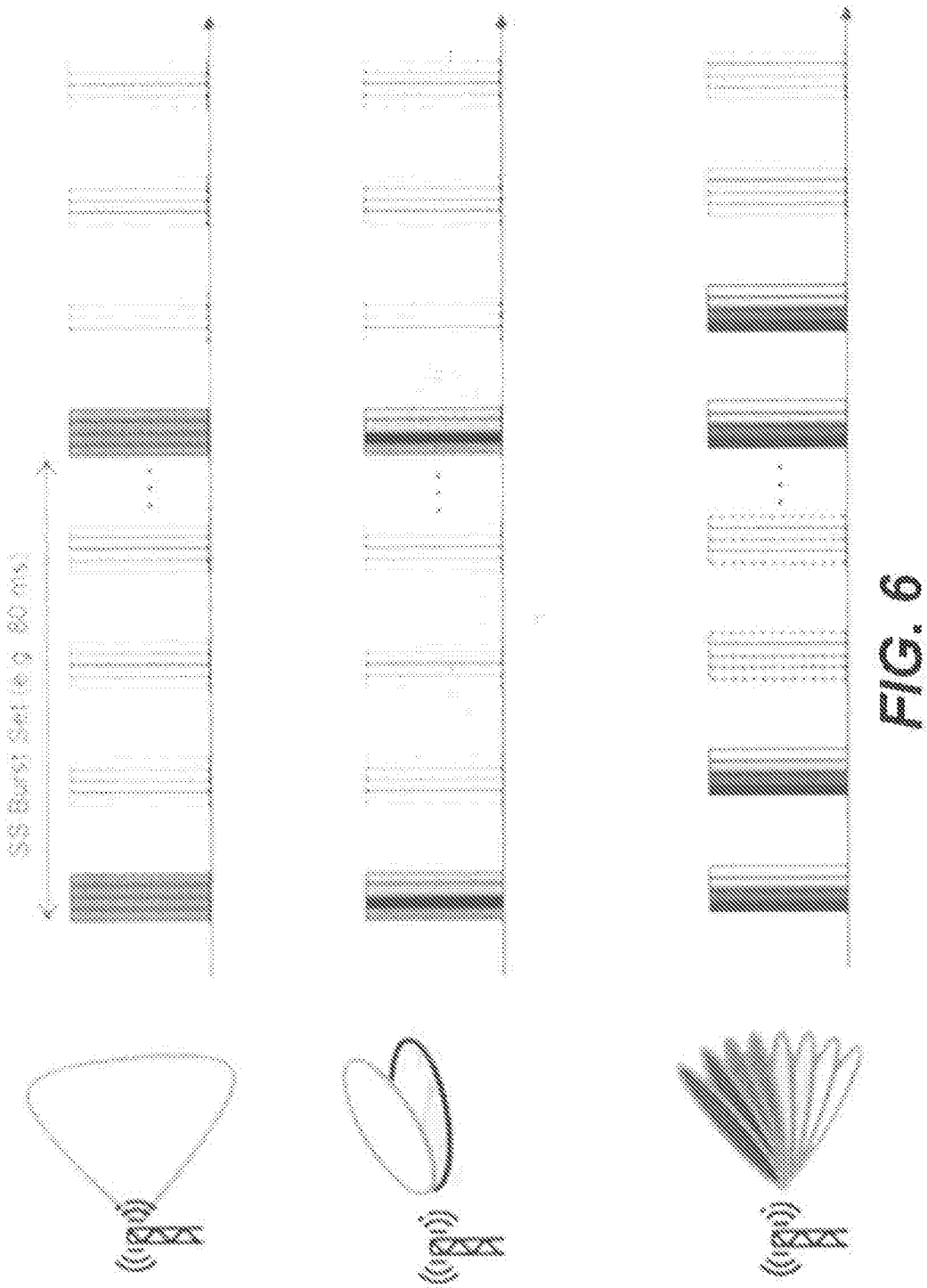
FIG. 6 illustrates an example of different configurations of an SS Burst Set, in accordance with certain embodiments.

In some embodiments a non-limiting term "user equipment" ("UE") is used. The UE herein can be any type of wireless device capable of communicating with network node or another UE over radio signals. The UE may also be radio communication device, target device, device-to-device (D2D) UE, machine type UE or UE capable of machine-to-machine communication (M2M), a sensor equipped with UE, iPAD, Tablet, mobile terminal, smart phone, laptop embedded equipped (LEE), laptop mounted equipment (LME), USB dongles, Customer Premises Equipment (CPE), etc.

Also in some embodiments generic terminology "network node," is used. It can be any kind of network node which may comprise of a radio network node such as base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU) Remote Radio Head (RRH), a multi-standard BS (also known as a MSR BS), a core network node (e.g., mobility management entity (MME), self-organizing network (SON) node, a coordinating node, positioning node, minimization of drive tests (MDT) node, etc.), or even an external node (e.g., $3^{rd}$ party node, a node external to the current network), etc. The network node may also comprise a test equipment.

The term "radio node" used herein may be used to denote a UE or a radio network node.

The embodiments are applicable to single carrier as well as to multicarrier or carrier aggregation (CA) operation of the UE in which the UE is able to receive and/or transmit data to more than one serving cells. The term carrier aggregation (CA) is also called (e.g., interchangeably called) "multi-carrier system," "multi-cell operation," "multi-carrier operation," "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly the secondary serving cell is interchangeably called as secondary cell (SCell) or secondary serving cell (SSC).

The term "signaling" used herein may comprise any of: high-layer signaling (e.g., via radio resource control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "radio measurement" used herein may refer to any measurement performed on radio signals. Radio measurements can be absolute or relative. Radio measurement may be called as signal level which may be signal quality and/or signal strength. Radio measurements can be e.g., intra-frequency, inter-frequency, CA, etc. Radio measurements can be unidirectional (e.g., downlink (DL) or uplink (UL)) or bidirectional (e.g., round trip time (RTT), Rx-Tx, etc.). Some examples of radio measurements: timing measurements (e.g., time of arrival (TOA), timing advance, RTT, reference signal time difference (RSTD), Rx-Tx, propagation delay, etc.), angle measurements (e.g., angle of arrival), power-based measurements (e.g., received signal power, reference signal received power (RSRP), received signal quality, reference signal received quality (RSRQ), signal-to-interference-plus-noise ratio (SINR), signal-to-noise ratio (SNR), interference power, total interference plus noise, receive strength signal indicator (RSSI), noise power, etc.), cell detection or cell identification, radio link monitoring (RLM), system information (SI) reading, etc.

The term measurement performance used herein may refer to any criteria or metric which characterizes the performance of the measurement performed by a radio node. The term measurement performance is also called as measurement requirement, measurement performance requirements, etc. The radio node has to meet one or more measurement performance criteria related to the performed measurement. Examples of measurement performance criteria are measurement time, number of cells to be measured with the measurement time, measurement reporting delay, measurement accuracy, measurement accuracy with respect to a reference value (e.g., ideal measurement result), etc. Examples of measurement time are measurement period, cell identification period, evaluation period, etc.

In certain embodiments, the network node signals information about a common parameter (N) per carrier frequency which informs the UE about a maximum number of beams on whose signals the UE can perform measurements on any cell on the indicated carrier.

The information about the carrier frequency associated with the parameter N is also indicated (i.e., signaled) to the UE. The information about the carrier frequency can be expressed in terms of frequency channel number. Examples of frequency channel number include absolute radio frequency channel number (ARFCN), NARFCN, etc.

The network node may also signal the UE, a plurality of parameters (e.g., N11, N12, N13, . . . N1$m$) for plurality of carrier frequencies (F1, F2, F2, . . . F1$m$). For example the parameters N11, N12, N13, . . . , N1$m$ are associated with carrier frequencies F1, F2, F2, . . . F1$m$ respectively.

The UE, upon receiving one or more beam related parameter per carrier (e.g., N11), use the beam related parameter(s) for performing one or more radio measurements on one or more beams of one or more cells operating on the carrier (e.g., F1) associated with the signaled parameter.

For example assume that the network node signals N=8 beams for carrier, F1, to the UE. Then in this case the UE assumes that on each cell belonging to carrier, F1, the UE can perform measurements on up to N=8 beams (e.g., for deriving overall cell measurement e.g., cell quality, signal quality, signal strength, etc.).

In another aspect of this embodiment, the network node signals an indicator whether or not all the cells belonging to a particular carrier have the same number of beams. In case the number of beams are the same in all cells, then the UE may determine the number of beams on any one cell of that carrier (e.g., by reading its system information, by blindly detecting beams, etc.) and assume the same number of beams on the remaining cells. Otherwise the UE may have to acquire information about the beams on each cell, for example, by reading system information (SI) of each cell.

In yet another aspect of this embodiment, the network node signals an indicator whether or not the number of beams on a group of cells (e.g., neighbor cells, all cells of a carrier) on a particular carrier is the same as the number of beams on a reference cell. Example of the reference cell is the serving cell. In case the number of beams in the group of a cell on the same carrier are the same as the number of beams on the reference cell then the UE determines the number of beams on the reference cell (e.g., by reading its system information, by blindly detecting beams etc.) and assumes the same number of beams on the remaining cells. Otherwise the UE may have to acquire information about the beams on each cell, e.g., by reading SI of each cell.

In yet another aspect of this embodiment, the network node signals an indicator whether or not the number of beams on cells belonging to a particular carrier (e.g., F2) is the same as the number of beams on cells belonging to certain reference carrier F1. Examples of F1=carrier of PCell and F2=carrier of SCell. In another example F1=carrier of PCell and F2 can be inter-frequency carrier.

The network node may signal the information (as described above) in a system information (e.g., common for all UEs) and/or in a UE specific message (e.g., over dedicated channel). The information may be transmitted using lower layers (e.g., L1 channel, medium access control (MAC) command) or higher layer (e.g., RRC message, etc.).

In all the above variants of the first embodiment, the UE uses the determined value of N per carrier frequency for performing one or more measurements on one or more beams of one or more cells of the carrier associated with the parameter N. The performed measurements are used by UE for one or more operational tasks. Examples of tasks are reporting the measurement results to the network node (e.g., serving cell), to another UE (e.g., capable of D2D operation, vehicle-to-vehicle (V2V) operation, vehicle-to-anything (V2X) operation, etc.), using the results for cell change (e.g., handover (HO), cell selection, cell reselection, RRC re-establishment, RRC connection release with re-direction, etc.), positioning of the UE, minimization of drive test (MDT), for performing power control, etc. This is further described below.

The method comprises a UE being configured by the network with a parameter N defined per carrier frequency where N is the number of beams to be used by the UE to derive the cell quality in scenarios where each cell transmits its synchronization signals and/or reference signals in multiple beams, a sin the case of NR transmitting SS Block Sets in multiple beams where each beam is transmitting a so-called SS Block.

For each configured carrier frequency, the UE should search for cells and, for the detected cells, the UE should use the parameter N configured per carrier to derive the cell quality. Hence, if the UE finds 7 cells for a given carrier-1 configured with N=5 the UE should consider 5 beams for all cells within that carrier to derive the cell quality values.

In yet another aspect of this disclosure, the network node before signaling the parameter N per carrier (or plurality of parameters, N11, N12, . . . N1$n$ for corresponding carriers, F1, F2 . . . Fn respectively) the network node derives the common parameter N based on one or more criteria. This is described below with examples.

In one example, the network node obtains information about the number of beams used in one or more neighbor cells. The network node may obtain said information based on pre-defined information (e.g., stored in the network node), information received from another network node (e.g., from neighbor network node), from a UE, based on antenna configurations used in other cells, etc. The UE may then derive a common parameter N based on the obtained information. This is explained with an example below.

Assume that the network node obtains information about number of beams M1, M2, M3, . . . , Mk used in 'k' cells operating on the same carrier (F1) i.e., cell1, cell2, cell3, . . . , cellk respectively. As an example the common parameter K is derived by using the following function:

$$N=F(M1, M2, M3, \ldots Mk)$$

Examples of function F( ) are maximum, minimum, average, Xth percentile, etc.

Typically this will require the network nodes (e.g., gNBs) to exchange their cell beam information to derive one common value of N for each carrier. The information may also be exchanged between eNB and gNB or between any type of network nodes.

The method also comprises the possibility that the UE is provided with cell-specific $N_{cs}(i)$ offset values per i-th cell. In that particular case, once the UE has detected a cell in a carrier configure with Nf(j) the UE should assume N=Nf(j)+$N_{cs}(i)$. Notice that the UE can also be configured with an UE-specific offset so that N=Nf(j)+$N_{cs}(i)$+$N_{ue}$, where network can do that based on UE beamforming capabilities.

The method also comprises a network node requesting another network node cell-specific offsets for N for cells in a given carrier. This could be exchanged as part of an inter-node interface establishment procedure where when nodes inform the cells defined per carrier they may also include this N cell-offset parameter. That could then be used when one of these nodes are configuring a UE to perform measurements based on cell quality.

The UE method also comprises the UE detecting a cell whose offset has not been provided, the UE reading in the broadcasted system information of that detected neighbor cell its cell-specific N parameter and reporting back to its serving node. That could be a default and/or triggered procedure where the configuration occurs upon the UE sending a measurement report with a newly discovered cell based on the per carrier N value and the network detecting that this new cell is not on its neighbor cells list and/or it does not have the cell-specific offset for that cell. Notice that the network can choose to trigger this procedure only when needed, such as when failure reports (e.g., radio link failure (RLF) reports, HO failures, etc.) associated to a particular cell are being reported by UE's and/or when cell based statistics are indicating that.

Figure 7:
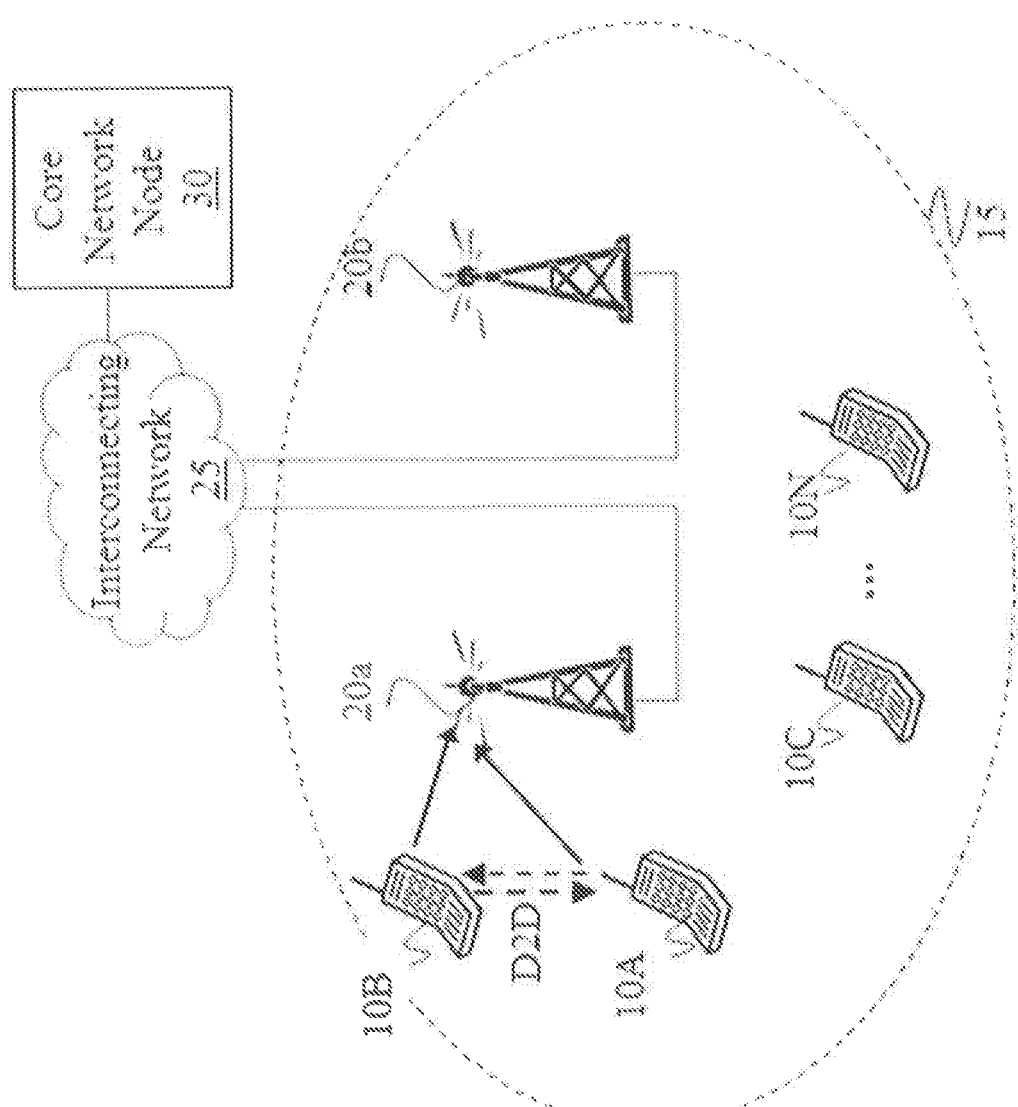
FIG. 7 illustrates an example of a wireless network, in accordance with certain embodiments.

FIG. 7 is a block diagram illustrating an example wireless network, in accordance with certain embodiments. The wireless network includes wireless devices 10A-10N (which may interchangeably be referred to by the non-limiting term user equipment, UE) and a plurality of network nodes, such as radio network nodes 20A-20B (e.g., eNBs, gNBs, base stations, etc.) and one or more core network nodes 30, which may communicate via an interconnecting network 25. Wireless devices 10 within coverage area 15 may each be capable of communicating directly with radio network nodes 20 over a wireless interface. In certain embodiments, wireless devices may also be capable of communicating with each other via device-to-device (D2D) communication.

As an example, wireless device 10A may communicate with radio network node 20A over a wireless interface. That is, wireless device 10A may transmit wireless signals and/or receive wireless signals from radio network node 20A. The wireless signals may contain voice traffic, data traffic, control signals, and/or any other suitable information. In some embodiments, an area of wireless signal coverage associated with a radio network node 20 may be referred to as a cell 15.

Wireless device 10 can be any type of wireless device capable of communicating with radio network nodes 20 or another wireless device/UE 10 over radio signals. Similarly, radio network node 20 can be any kind of radio network node capable of communicating with wireless device 10 or another network node. For example, the term network node may refer to radio network node 20, core network node 30, or even an external node (e.g., 3rd party node, a node external to the current network), etc. Example embodiments of wireless device 10 are described in more detail below with respect to FIGS. 8 and 9. Example embodiments of radio network node 20 are discussed below with respect to FIGS. 10 and 11.

In certain embodiments, radio network nodes 20 may interface with a radio network controller. The radio network controller may control radio network nodes 20 and may provide certain radio resource management functions, mobility management functions, and/or other suitable functions. In certain embodiments, the functions of the radio network controller may be included in radio network node 20. The radio network controller may interface with a core network node 30. In certain embodiments, the radio network controller may interface with the core network node 30 via an interconnecting network 25.

The interconnecting network 25 may refer to any interconnecting system capable of transmitting audio, video, signals, data, messages, or any combination of the preceding. The interconnecting network 125 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 30 may manage the establishment of communication sessions and various other functionalities for wireless devices 10. Examples of core network node 30 may include mobile switching center (MSC), MME, serving gateway (SGW), packet data network gateway (PGW), operation and maintenance (O&M), operations support system (OSS), SON, positioning node (e.g., Enhanced Serving Mobile Location Center, E-SMLC), MDT node, etc. Wireless devices 10 may exchange certain signals with the core network node using the non-access stratum layer. In non-access stratum signaling, signals between wireless devices 10 and the core network node 30 may be transparently passed through the radio access network. In certain embodiments, radio network nodes 20 may interface with one or more network nodes over an internode interface. For example, radio network nodes 20A and 20B may interface over an X2 interface or an evolution thereof.

Although FIG. 7 illustrates a particular arrangement of the network, the present disclosure contemplates that the various embodiments described herein may be applied to a variety of networks having any suitable configuration. For example, the wireless network may include any suitable number of wireless devices 10 and radio network nodes 20, as well as any additional elements suitable to support communication between wireless devices or between a wireless device and another communication device (such as a landline telephone). The embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data).

Figure 8:
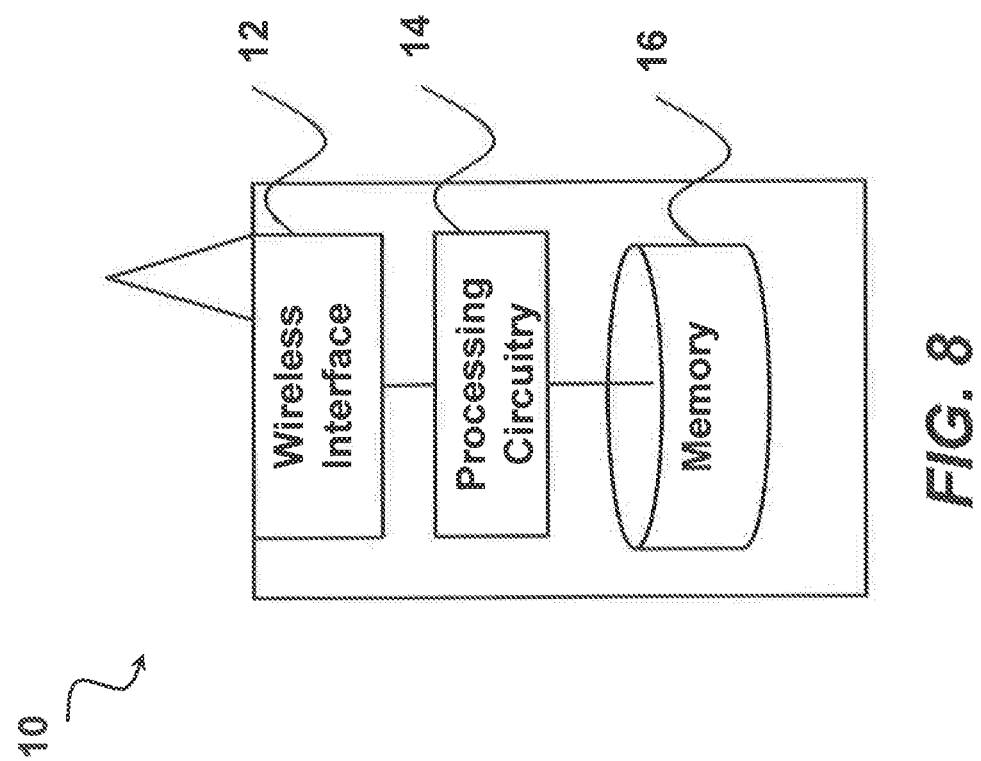
FIG. 8 illustrates an example of a wireless device, in accordance with certain embodiments.

FIG. 8 is a block diagram of a wireless device 10, in accordance with certain embodiments of the present disclosure. Wireless device 10 can correspond, for example, to the wireless device (or UE) described above. Wireless device 10 includes a wireless interface 12, processing circuitry 14, and memory 16. The wireless interface 12 may comprise a transceiver having certain receiver and transmitter capabilities as described above in conjunction with FIGS. 1 to 7. In some embodiments, the wireless interface 12 facilitates transmitting wireless signals to and receiving wireless signals from radio network node 20 (e.g., via an antenna), the processing circuitry 14 executes instructions to provide some or all of the functionalities described herein as being provided by wireless device 10, and the memory 16 stores the instructions for execution by the processing circuitry 14.

The processing circuitry 14 may include any suitable combination of hardware and software implemented in one or more modules to execute instructions and manipulate data to perform some or all of the described functions of wireless device 10 (or UE), such as the functions of wireless device 10 (or UE) described above. In some embodiments, the processing circuitry 14 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, the processing circuitry 14 may comprise one or more of the modules discussed below with respect to FIG. 9.

The memory 16 is generally operable to store instructions, such as a computer program, software, an application including one or more of logic, rules, algorithms, code, tables, etc. and/or other instructions capable of being executed by a processing circuitry 14. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor of wireless device 10.

Other embodiments of wireless device 10 may include additional components beyond those shown in FIG. 8 that may be responsible for providing certain aspects of the wireless device's functionality, including any of the functionality described above and/or any additional functionality (including any functionality necessary to support the solution described above). As just one example, wireless device 10 may include input devices and circuits, output devices, and one or more synchronization units or circuits, which may be part of the processor. Input devices include mechanisms for entry of data into wireless device 10. For example, input devices may include input mechanisms, such as a microphone, input elements, a display, etc. Output devices may include mechanisms for outputting data in audio, video and/or hard copy format. For example, output devices may include a speaker, a display, etc.

Figure 9:
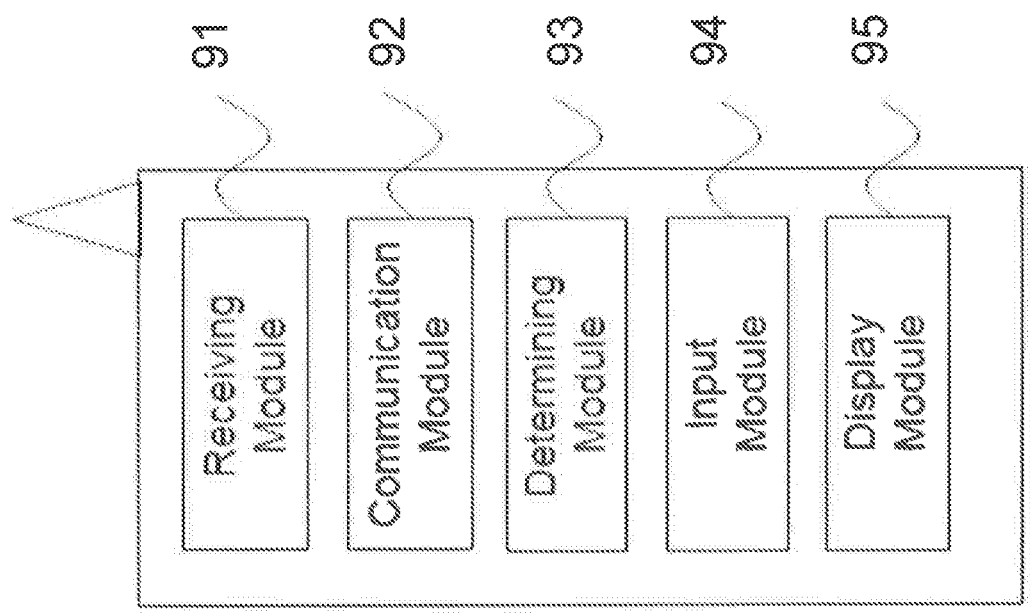
FIG. 9 illustrates an example of components for a wireless device, in accordance with certain embodiments.

FIG. 9 is a block diagram illustrating examples of modules that may be included in a wireless device 10, in accordance with certain embodiments of the present disclosure. In certain embodiments, wireless device may include any one or more of: receiving module(s) 91, communicating module(s) 92, determining module(s) 93, input module(s) 94, display module(s) 95 and/or other suitable modules. The functionality of the modules may be integrated in a single component or separated among several components in any suitable manner. In certain embodiments, one or more of the modules may be implemented using processing circuitry 14 described with respect to FIG. 8.

Determining module 93 may perform the processing functions of wireless device 10 (including any of the UE functionality to support the above-described embodiments). As one example, determining module 93 may determine beams on which to perform radio measurements based on one or more beam related parameters (N) per carrier received from a network node. For example, determining module 93 may use the beam related parameter(s) for performing one or more radio measurements on one or more beams of one or more cells operating on the carrier (e.g., F1) associated with the parameter received from the network node.

Determining module 93 may include or be included in one or more processors, such as processing circuitry 14 described above in relation to FIG. 8. Determining module 93 may include analog and/or digital circuitry configured to perform any of the functions of determining module 93 and/or processing circuitry 14 described above. The functions of determining module 93 described above may, in certain embodiments, be performed in one or more distinct modules.

Communication module 92 may perform the transmission functions of wireless device 10. As one example, communication module 92 may report radio measurements to a network node. Communication module 92 may include a transmitter and/or a wireless interface, such as wireless interface 12 described above in relation to FIG. 8. Communication module 92 may include circuitry configured to wirelessly transmit messages and/or signals. In particular embodiments, communication module 92 may receive messages and/or signals for transmission from determining module 93. In certain embodiments, the functions of communication module 93 described above may be performed in one or more distinct modules.

Receiving module 91 may perform the receiving functions of wireless device 10. For example, receiving module 91 may receive beam related parameter per carrier (e.g., N11). Receiving module 91 may include a receiver and/or a wireless interface, such as wireless interface 12 described above in relation to FIG. 8. Receiving module 91 may include circuitry configured to wirelessly receive messages and/or signals. In particular embodiments, receiving module 91 may communicate received messages and/or signals to determining module 93. The functions of receiving module 91 described above may, in certain embodiments, be performed in one or more distinct modules.

Input module 94 may receive user input intended for wireless device 10. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 93. The functions of input module 94 described above may, in certain embodiments, be performed in one or more distinct modules.

Display module 95 may present signals on a display of wireless device 10. Display module 95 may include the display and/or any appropriate circuitry and hardware configured to present signals on the display. Display module 95 may receive signals to present on the display from determining module 95. The functions of display module 95 described above may, in certain embodiments, be performed in one or more distinct modules.

Determining module 93, communication module 92, receiving module 91, input module 94, and display module 95 may include any suitable configuration of hardware and/or software. Wireless device 10 may include additional modules beyond those shown in FIG. 9 that may be responsible for providing any suitable functionality, including any of the functionality described above and/or any additional functionality (including any functionality necessary to support the various solutions described herein).

Figure 10:
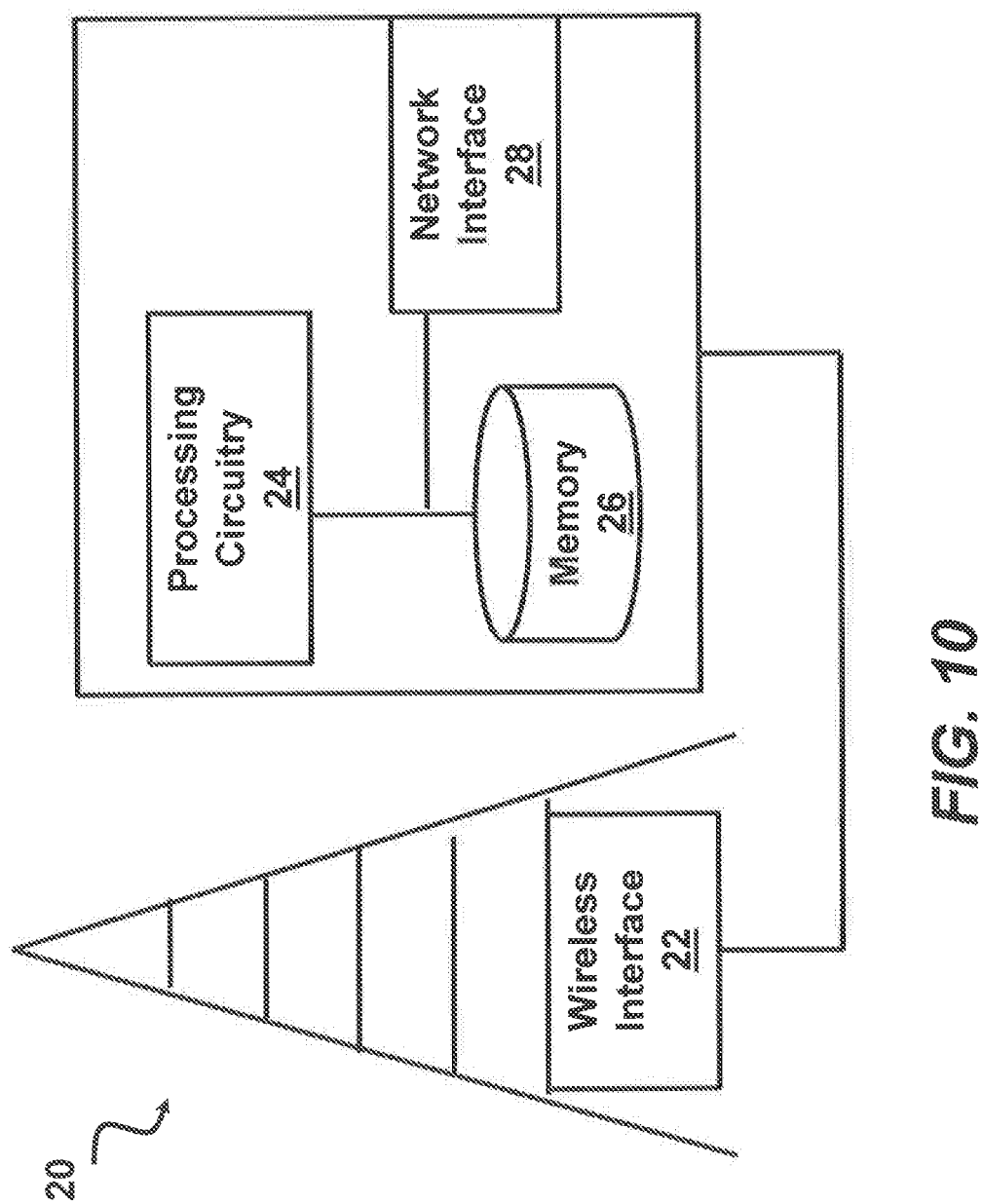
FIG. 10 illustrates an example of a network node, in accordance with certain embodiments.

FIG. 10 is a block diagram of a network node (e.g., radio network node 20), in accordance with certain embodiments of the present disclosure. As discussed above, a radio network node 20 is one example of a network node. Radio network node 20 may include one or more of a wireless interface 22, processing circuitry 24, memory 26, and network interface 28. The wireless interface 22 may comprise a transceiver having receiver and transmitter capabilities. In some embodiments, the wireless interface 22 facilitates transmitting wireless signals to and receiving wireless signals from wireless device 10 (e.g., via an antenna), the processing circuitry 24 executes instructions to provide some or all of the functionalities described above as being provided by radio network node 20 (or, more generally, as being provided by a network node), the memory 26 stores the instructions for execution by the processing circuitry 24, and the network interface 28 communicates signals to back-end network components, such as a gateway, switch, router, Internet, Public Switched Telephone Network (PSTN), core network nodes 30 or radio network controllers, etc.

The processing circuitry 24 may include any suitable combination of hardware and software implemented in one or more modules to execute instructions and manipulate data to perform some or all of the described functions of radio network node 20 (or, more generally, of a network node), such as those described above. As an example, processing circuitry 24 may execute instructions and manipulate data to perform any of the methods described above, such as methods in which a network node determines at least one parameter N per carrier frequency (wherein the parameter N indicates a maximum number of beams to be used by a wireless device for signal measurements in a cell) and communicates the parameter(s) N to the wireless device. In some embodiments, the processing circuitry 24 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, the processing circuitry 24 may comprise one or more of the modules discussed below with respect to FIG. 11.

The memory 26 is generally operable to store instructions, such as a computer program, software, an application including one or more of logic, rules, algorithms, code, tables, etc. and/or other instructions capable of being executed by a processing circuitry 24. Examples of memory 26 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 28 is communicatively coupled to the processing circuitry 24 and may refer to any suitable device operable to receive input for radio network node 20, send output from radio network node 20, perform suitable processing of the input or output or both, communicate to other devices, or any combination of the preceding. The network interface 28 may include appropriate hardware (e.g., port, modem, network interface card, etc.) and software, including protocol conversion and data processing capabilities, to communicate through a network.

Other embodiments of radio network node 20 may include additional components beyond those shown in FIG. 10 that may be responsible for providing certain aspects of the access node's functionality, including any of the functionality described above and/or any additional functionality (including any functionality necessary to support the solutions described above). The various different types of access nodes may include components having the same physical hardware but configured (e.g., via programming) to support different radio access technologies, or may represent partly or entirely different physical components.

Processors 24, interfaces 22, 25, and/or 28, and memory 26 similar to those described with respect to FIG. 10 may be included in other network nodes (such as core network node 30). Other network nodes may optionally include or not include a wireless interface (such as the wireless interface 22 described in FIG. 10).

Figure 11:
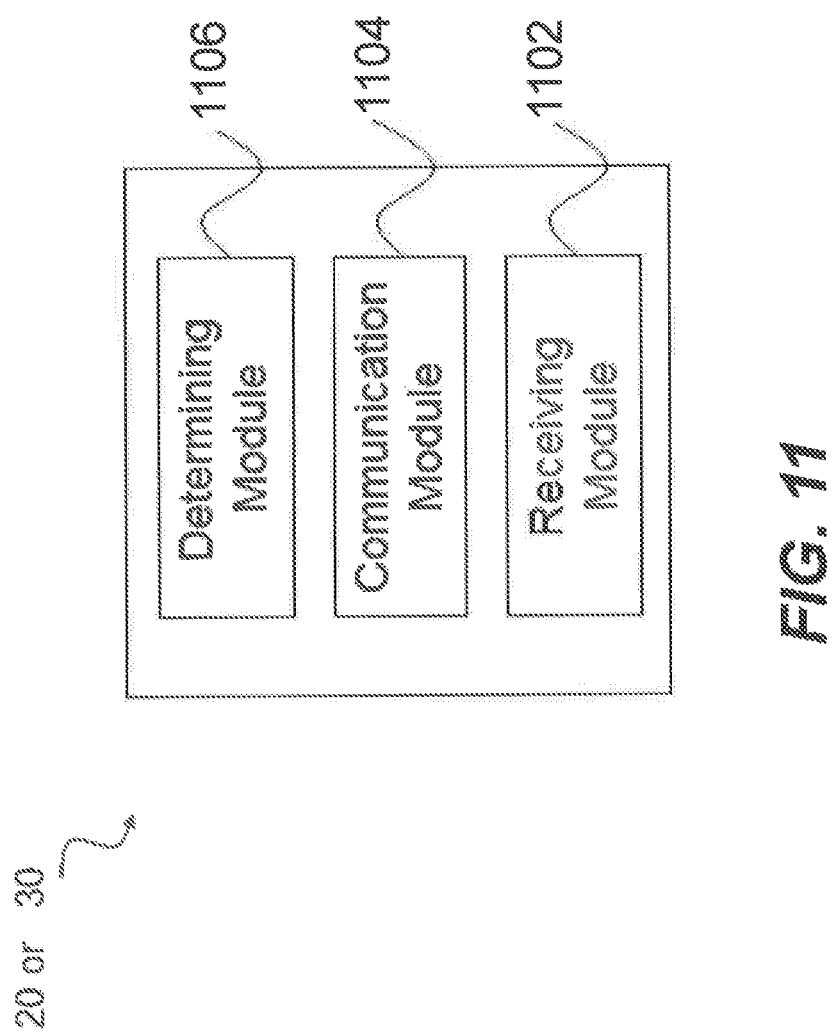
FIG. 11 illustrates an example of components for a network node, in accordance with certain embodiments.

FIG. 11 is a block diagram illustrating examples of modules that may be included in a network node, such as radio network node 20 or core network node 30, in accordance with certain embodiments of the present disclosure. In certain embodiments, radio network node 20 may include any one or more of: receiving module(s) 1102, communicating module(s) 1104, determining module(s) 1106, and/or other suitable modules. The functionality of the modules may be integrated in a single component or separated among several components in any suitable manner. In certain embodiments, one or more of the modules may be implemented using processing circuitry 24 described with respect to FIG. 10.

Determining module 1106 may perform the processing functions of network node 20 (including any of the network node functionality to support the above-described embodiments). As one example, determining module 1106 may determine information about a common parameter (N) per carrier frequency which informs the UE about a maximum number of beams on whose signals the UE can perform measurements on any cell on the indicated carrier.

Determining module 1106 may include or be included in one or more processors, such as processing circuitry 24 described above in relation to FIG. 10. Determining module 1106 may include analog and/or digital circuitry configured to perform any of the functions of determining module 1106 and/or processing circuitry 14 described above. The functions of determining module 1106 described above may, in certain embodiments, be performed in one or more distinct modules.

Communication module 1104 may perform the transmission functions of network node 20. As one example, communication module 1104 may send information about a common parameter (N) per carrier frequency which informs the UE about a maximum number of beams on whose signals the UE can perform measurements on any cell on the indicated carrier. Communication module 1104 may include a transmitter and/or a wireless interface, such as wireless interface 22 described above in relation to FIG. 10. As another example, communication module 1104 may send information to other network nodes 20, such as information about cell-specific offsets for N in the different carriers. Communication module 1104 may include a network interface, such as interface 28 described above in relation to FIG. 10. Communication module 1104 may include circuitry configured to transmit wireless and/or wired messages and/or signals. In particular embodiments, communication module 1104 may receive messages and/or signals for transmission from determining module 1106. In certain embodiments, the functions of communication module 1106 described above may be performed in one or more distinct modules.

Receiving module 1102 may perform the receiving functions of network node 20. For example, receiving module 1102 may receive measurements reports from wireless device 10. Receiving module 1102 may include a receiver and/or a wireless interface, such as wireless interface 22 described above in relation to FIG. 10. As another example, receiving module may receive information from other network nodes 20, such as information about cell-specific offsets for N in the different carriers. Receiving module 1102 may include a network interface, such as interface 28 described in relation to FIG. 10. Receiving module 1102 may include circuitry configured to receive wireless and/or wired messages and/or signals. In particular embodiments, receiving module 1102 may communicate received messages and/or signals to determining module 1106. The functions of receiving module 1102 described above may, in certain embodiments, be performed in one or more distinct modules.

Figure 12:
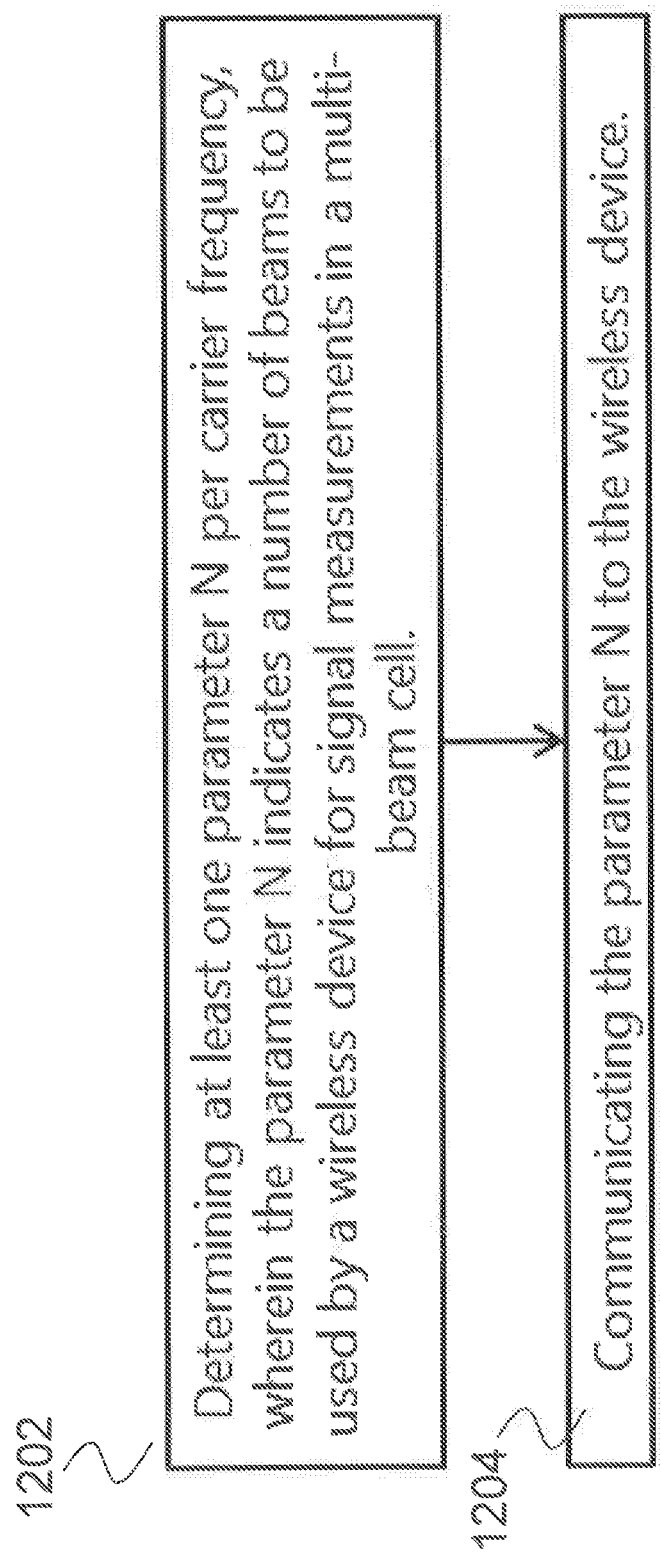
FIG. 12 illustrates an example of a method for use in a network node, in accordance with certain embodiments.
Figure 13:
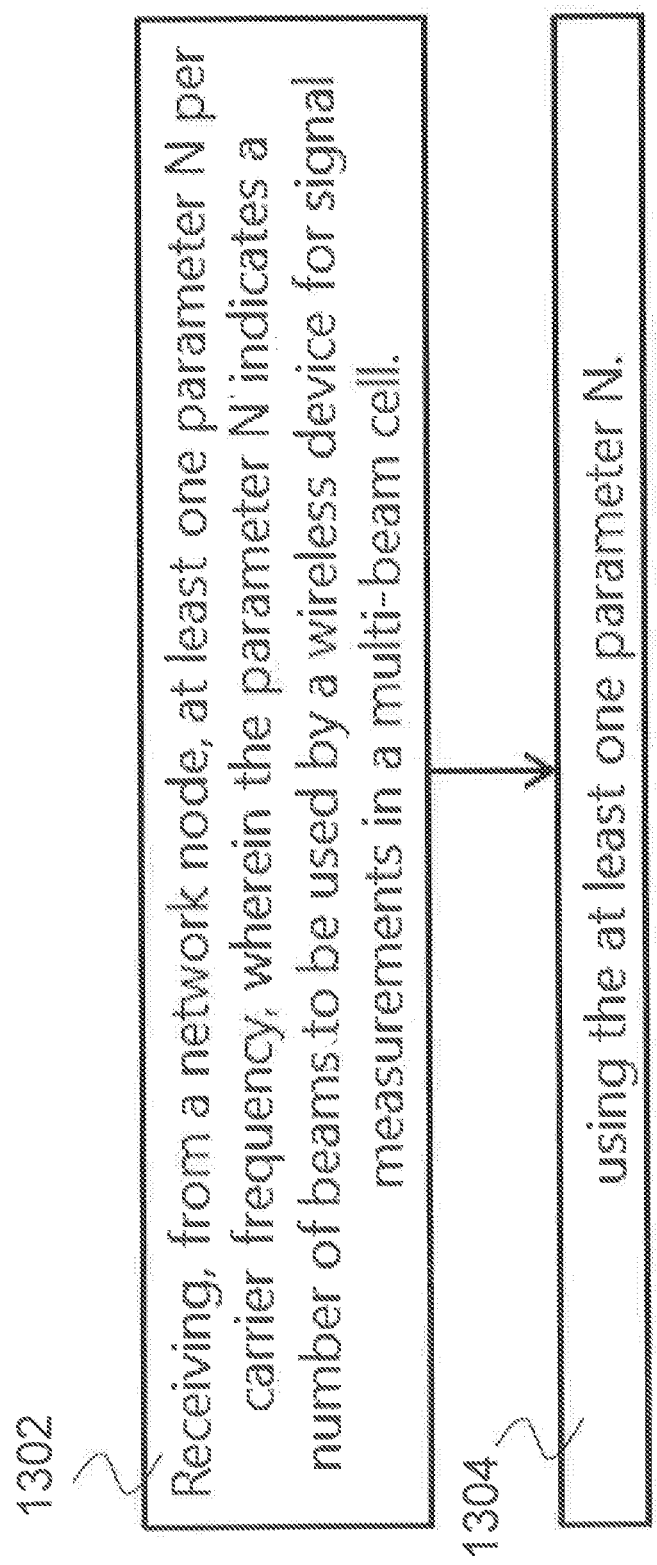
FIG. 13 illustrates an example of a method for use in a wireless device, in accordance with certain embodiments.

The following provide additional examples of embodiments. The examples may be implemented using any of the above-discussed components and may be combined with any other above-discussed embodiments in any suitable manner. Example embodiments 1 and 10 are illustrated in FIGS. 12 and 13, respectively.

1. A method for use in a network node, the method comprising:

determining (1202) at least one parameter N per carrier frequency, wherein the parameter N indicates a number of beams to be used by a wireless device for signal measurements in a multi-beam cell; and communicating (1204) the parameter N to the wireless device.

2. The method of example embodiment 1, further comprising:

receiving, from one or more other network nodes, information about cell-specific offsets for parameter N in different carriers; and using the received information when determining the parameter N.

3. The method of example embodiment 1, further comprising:

receiving, from one or more other network nodes, information about a number of beams used in each network node's respective cells; and using the received information and information about the number of beams used in the network node's own cells to determine a common parameter N for all cells on a carrier.

4. A network node (20), comprising:

processing circuitry (24) operable to determine at least one parameter N per carrier frequency, wherein the parameter N indicates a number of beams to be used by a wireless device (10) for signal measurements in a multi-beam cell; and an interface (25) operable to communicate the parameter N to the wireless device.

5. The network node of example embodiment 4, further operable to:

receive, from one or more other network nodes, information about cell-specific offsets for parameter N in different carriers; and use the received information when determining the parameter N.

6. The network node of example embodiment 4, further operable to:

receive, from one or more other network nodes, information about a number of beams used in each network node's respective cells; and use the received information and information about the number of beams used in the network node's own cells to determine a common parameter N for all cells on a carrier.

7. A computer program product comprising a non-transitory computer readable storage medium (26) having computer readable program code embodied in the medium that, when executed by processing circuitry (24) of a network node (20) causes the network node to perform operations comprising:

determining at least one parameter N per carrier frequency, wherein the parameter N indicates a number of beams to be used by a wireless device for signal measurements in a multi-beam cell; and communicating the parameter N to the wireless device.

8. The computer program product of example embodiment 7, the operations further comprising:

receiving, from one or more other network nodes, information about cell-specific offsets for parameter N in different carriers; and using the received information when determining the parameter N.

9. The computer program product of example embodiment 7, the operations further comprising:

receiving, from one or more other network nodes, information about a number of beams used in each network node's respective cells; and using the received information and information about the number of beams used in the network node's own cells to determine a common parameter N for all cells on a carrier.

10. A method for use in a wireless device, the method comprising:

receiving (1302), from a network node, at least one parameter N per carrier frequency, wherein the parameter N indicates a number of beams to be used by a wireless device for signal measurements in a multi-beam cell; and using (1304) the at least one parameter N.

11. A wireless device (10), comprising:

an interface (12) operable to receive, from a network node (20), at least one parameter N per carrier frequency, wherein the parameter N indicates a number of beams to be used by a wireless device for signal measurements in a multi-beam cell; and processing circuitry (14) operable to use the at least one parameter N.

12. A computer program product comprising a non-transitory computer readable storage medium (16) having computer readable program code embodied in the medium that, when executed by processing circuitry (14) of a network node (10) causes the wireless to perform operations comprising:

receiving, from a network node, at least one parameter N per carrier frequency, wherein the parameter N indicates a number of beams to be used by a wireless device for signal measurements in a multi-beam cell; and using the at least one parameter N.

Figure 14A:
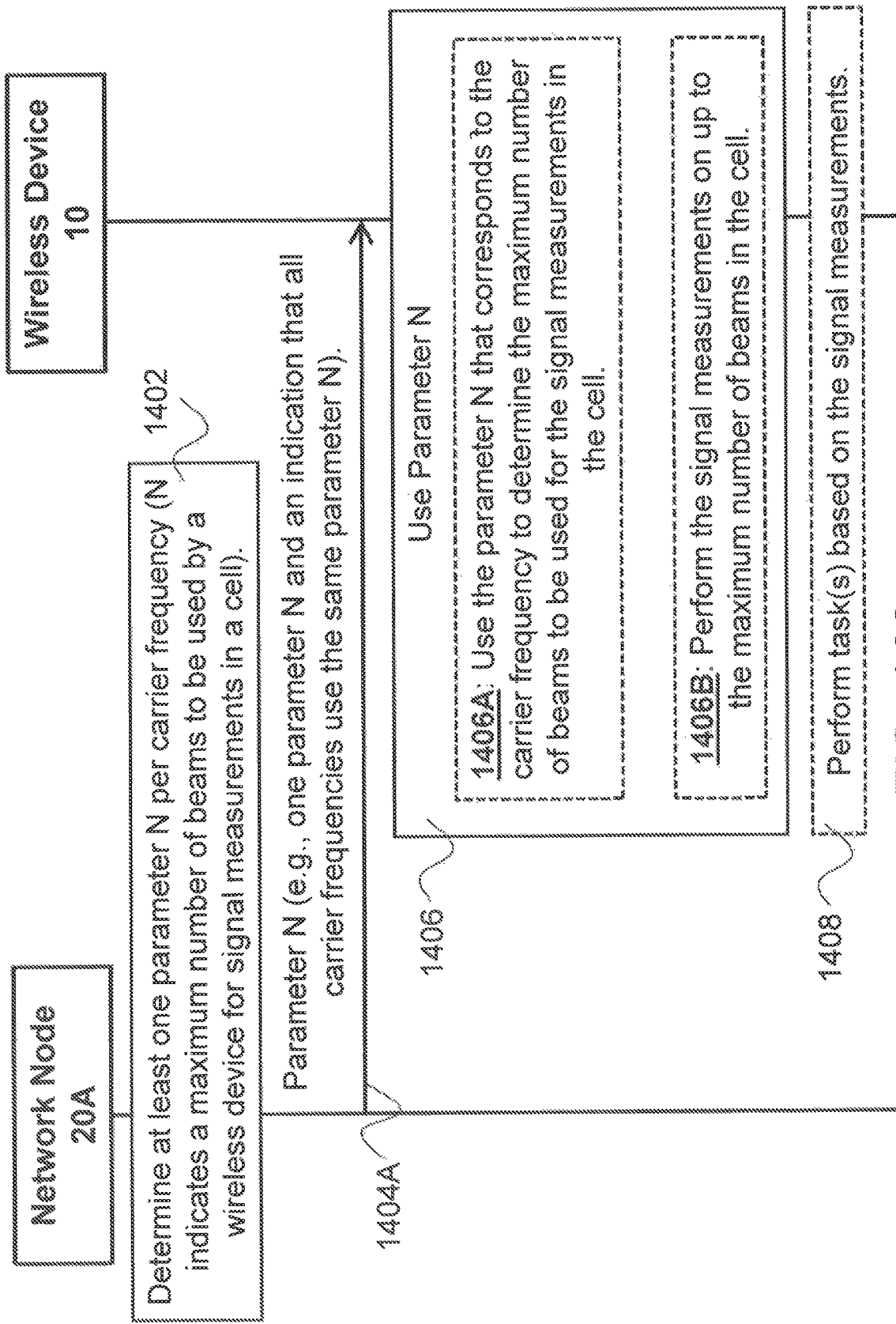
FIGS. 14A-C illustrate examples of signal flows in which a wireless device receives at least one parameter N per carrier frequency from a network node, in accordance with certain embodiments.
Figure 14B:
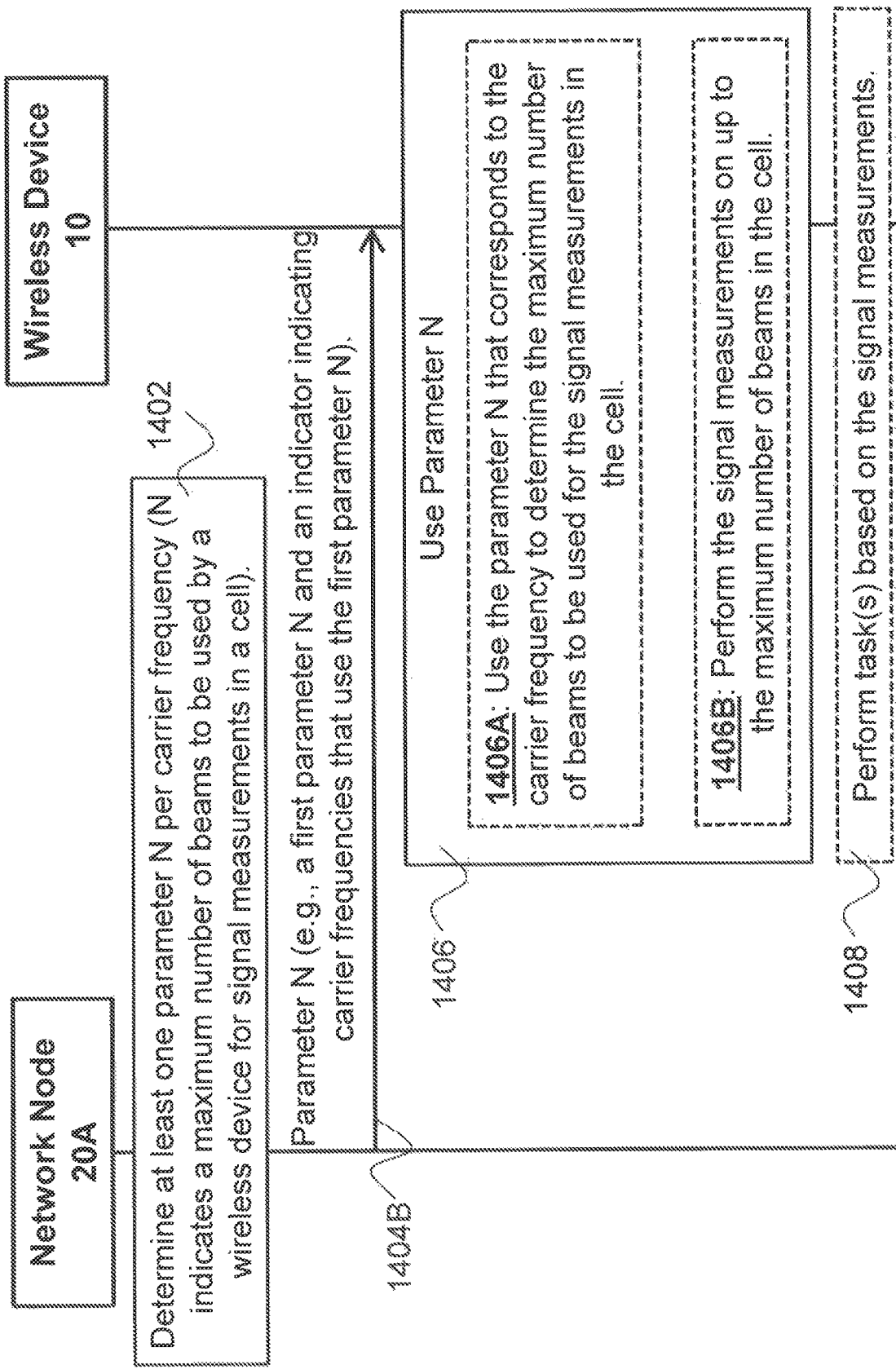
Figure 14C:
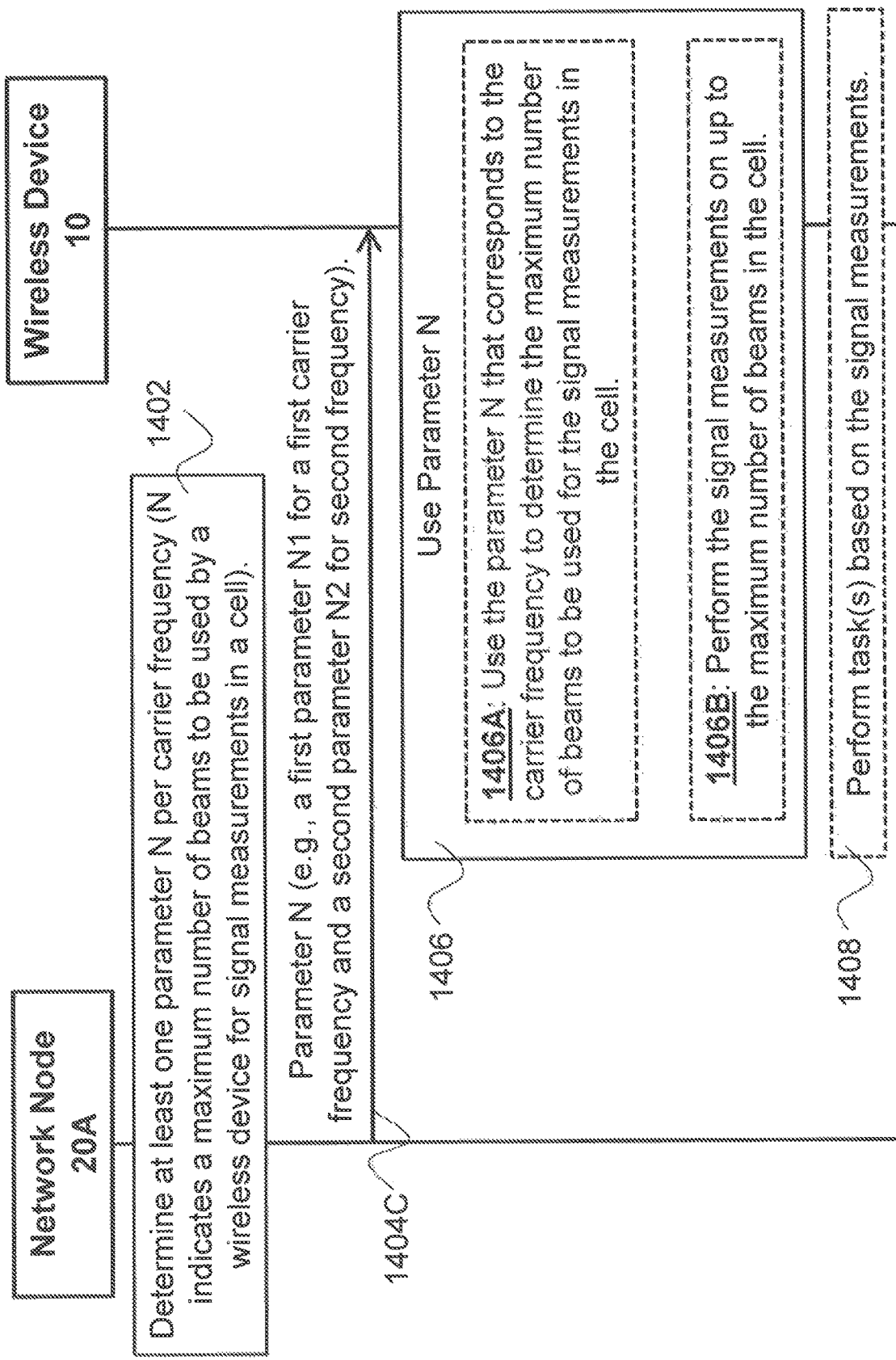

FIGS. 14A-C illustrate examples of signal flows in which a wireless device 10 receives at least one parameter N per carrier frequency from a network node 20A, in accordance with certain embodiments. In certain embodiments, a network node 20A (such as a network node that comprises a serving cell that serves wireless device 10) performs a method comprising steps 1402 and 1404 (e.g., 1404A, B, or C). In certain embodiments, a wireless device performs a method comprising steps 1404 (e.g., 1404A, B, or C), 1406, and optionally step 1408.

At step 1402, network node 20A determines at least one parameter N per carrier frequency. Parameter N indicates a maximum number of beams to be used by a wireless device for signal measurements in a cell. Network node 20A may determine parameter(s) N in order to assist the wireless device 10 when performing signal measurements on cells belonging to the same carrier frequency and/or performing signal measurements in a multi-beam cell.

At step 1404, network node 20A communicates the one or more parameters (N) determined in step 1402 to wireless device 10. Parameter(s) N can be communicated in system information common for all wireless devices or in dedicated signaling to the wireless device 10. In certain embodiments, the N parameter(s) are signaled from the network node to the wireless device in a measurement object (MeasObject) information element.

FIGS. 14A, B, and C each illustrate an example of an option for communicating parameter(s) N to wireless device 10. FIG. 14A illustrates an example in which network node 20A communicates one parameter N and an indicator indicating that all carrier frequencies use the same parameter N (e.g., step 1404A). FIG. 14B illustrates an example in which network node 20A communicates a first parameter N1 and an indicator indicating which carrier frequencies use the first parameter N1 (e.g., step 1404B). For example, the indicator may indicate to use the first parameter N1 for both a first carrier frequency and a second carrier frequency. FIG. 14C illustrates an example in which network node 20A communicates different parameters N for different carrier frequencies. For example, network node communicates a first parameter N1 and information associating the first parameter N1 with a first carrier frequency as well as a second parameter N2 and information associating the second parameter N2 with a second carrier frequency (e.g., step 1404C). The second carrier frequency is different than the first carrier frequency. In some embodiments, the information associating the first parameter N1 with the first carrier frequency comprises a frequency channel number of the first carrier frequency. Similarly, the information associated the second parameter N2 with the second carrier frequency comprises a frequency channel number of the second carrier frequency.

Wireless device 10 receives the parameter(s) N at step 1404 and uses the parameter(s) N in step 1406. For example, in certain embodiments, the parameter(s) N that correspond to a particular carrier frequency are used to determine the maximum number of beams to be used for performing the signal measurements in the cell (step 1406A) and performing the signal measurements on up to the maximum number of beams in the cell (step 1406B). The cell on which the signal measurements are performed may be a serving cell (e.g., a cell of network node 20A) or a neighboring cell (e.g., a cell of another network node). Examples of types of signal measurements that the wireless device 10 may perform include measurements of cell specific reference signals, measurements of synchronization signals, or radio resource management (RRM) measurements.

In certain embodiments, the at least one parameter N per carrier frequency comprises a first parameter N1 and a second parameter N2. The first parameter N1 is for performing a first type of signal measurements on a first carrier frequency. The second parameter N2 is for performing a second type of signal measurements on the same carrier frequency (i.e., the first carrier frequency). The second type of signal measurements is different than the first type of signal measurements. As an example, the first parameter N1 may be configured for performing measurements of synchronization signals on the first frequency, and the second parameter N2 may be configured for performing measurements of cell specific reference signals on the same frequency (i.e., the first frequency). The first and second parameters N may be configured such that the wireless device performs synchronization signal measurements on more beams and cell specific reference signal measurements on fewer beams, or vice versa.

FIGS. 14A-C each include an optional step 1408 in which wireless device 10 performs one or more tasks based on the signal measurements performed in step 1406B. Examples of tasks include deriving a signal quality of the cell, deriving a signal strength of the cell, reporting to the network node, reporting to a neighboring network node, reporting to another wireless device, changing a cell, positioning the wireless device, performing minimization of drive test, and/or performing power control.

As discussed above, the parameter(s) N are provided per carrier frequency. Providing parameter(s) N per carrier may reduce complexity that may otherwise be required if parameter(s) N were to be provided per cell. For example, if parameter(s) N were provided per cell, the wireless device 10 would need to know information for each cell and a list of neighbor cells. In the present disclosure, providing parameter(s) N per carrier frequency reduces this complexity and may allow for more consistent measurements because a carrier frequency has similar fading characteristics from one cell to the next.

Figure 15:
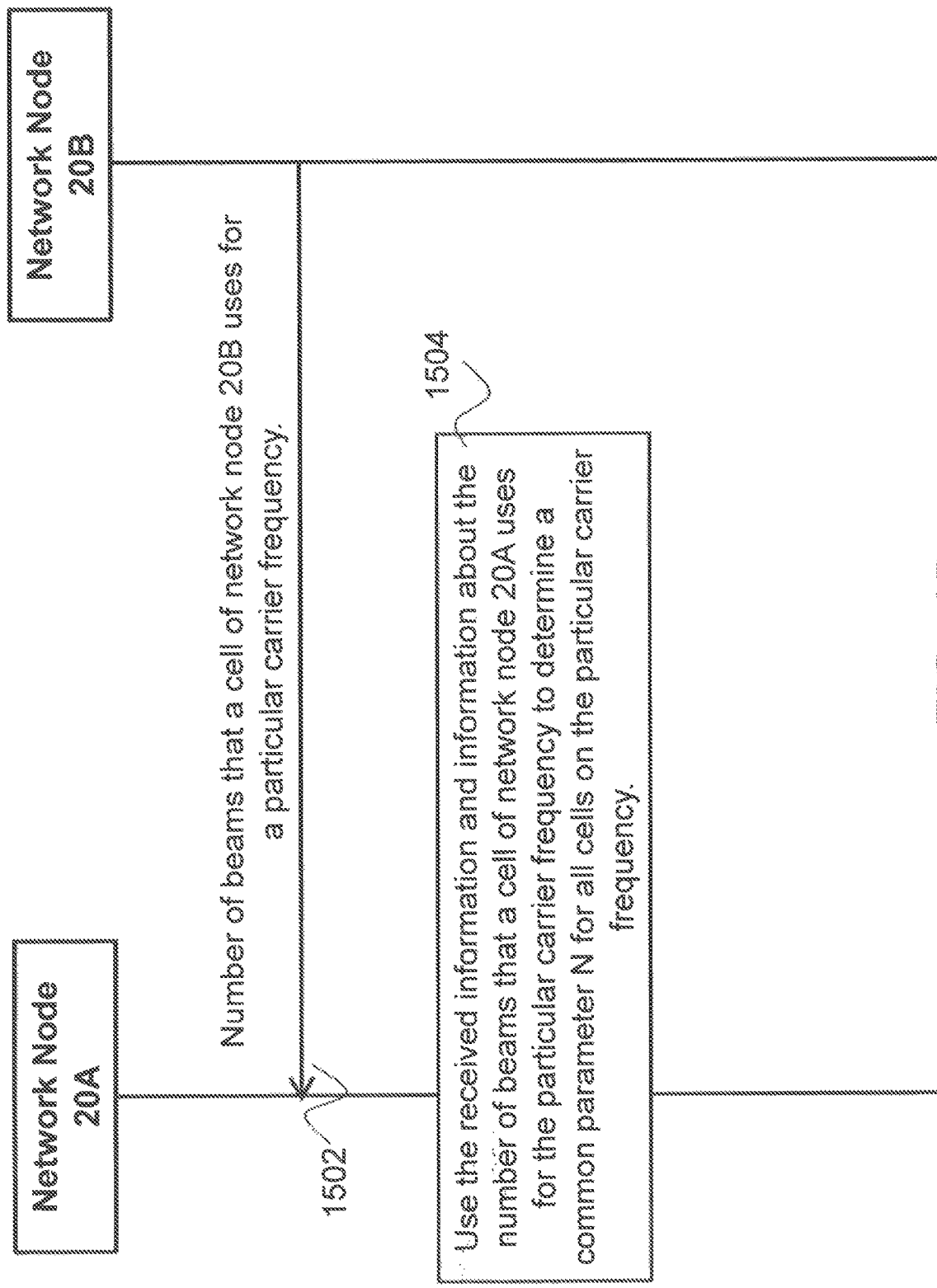
FIGS. 15-16 illustrate examples of signal flows in which a network node determines a common parameter N for all cells on a particular carrier frequency, in accordance with certain embodiments.
Figure 16:
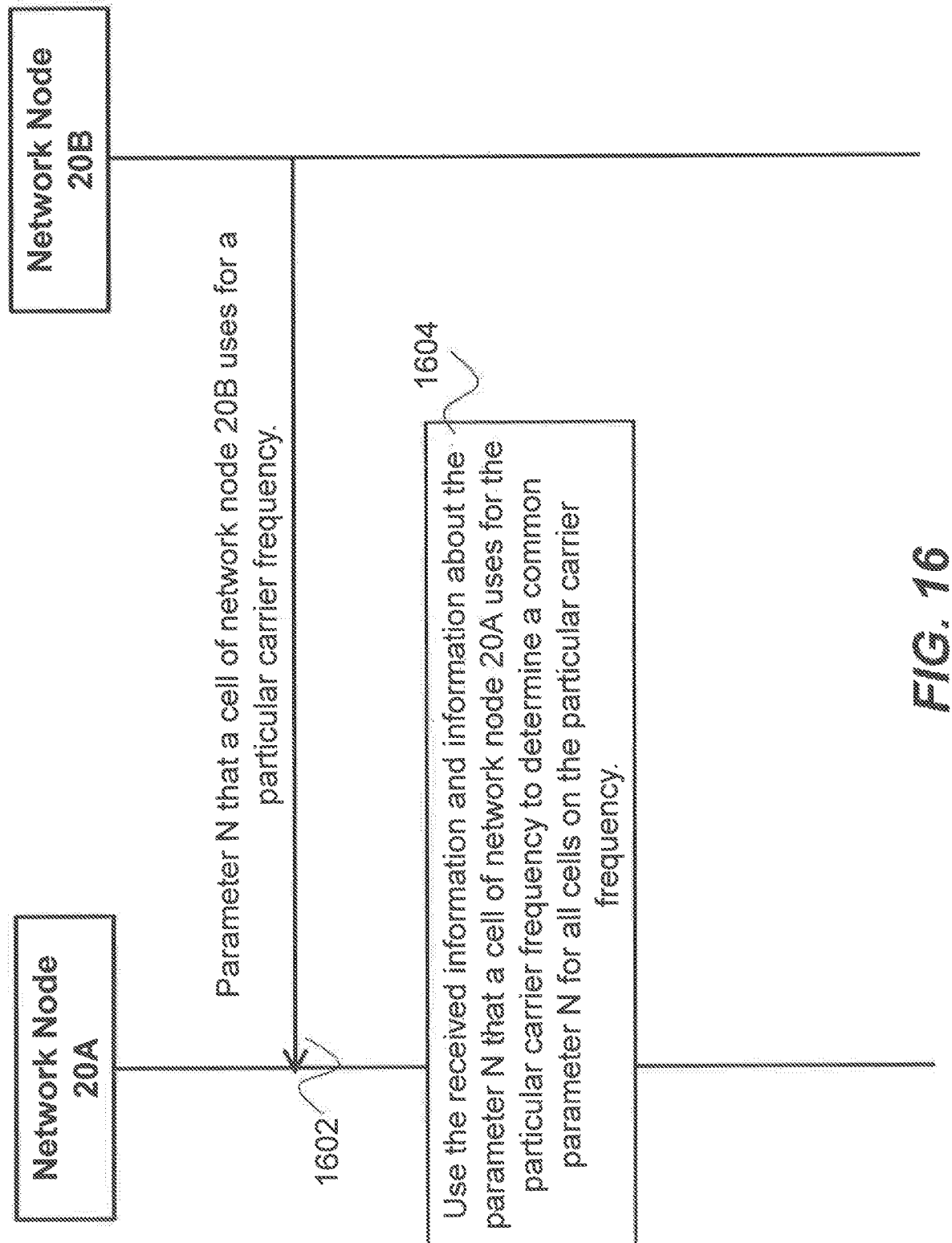

FIGS. 15-16 illustrate examples of signal flows in which a network node (such as network node 20A discussed with respect to FIGS. 14A-C) determines a common parameter N for all cells on a particular carrier frequency, in accordance with certain embodiments. In the example of FIG. 15, network node 20A receives information from one or more other network nodes in step 1502. The information indicates a number of beams each network node's respective cell uses for a particular carrier frequency. In the example of FIG. 15, network node 20A receives information from network node 20B about the number of beams a cell of network node 20B uses for a particular carrier frequency. At step 1504, network node 20A uses the received information (number of beams a cell of network node 20B uses for a particular frequency) and information about the number of beams used in the network node 20A's own cell for the particular carrier frequency to determine a common parameter N for all cells on the particular carrier frequency.

In the example of FIG. 16, network node 20A receives information about the parameters N that other network nodes use for a particular carrier frequency. In particular, in the example shown in FIG. 16, network node 20A receives information in step 1602 about the parameter N that a cell of network node 20B uses for a particular carrier frequency. At step 1604, network node 20A uses the received information (parameter N that a cell of network node 20B uses for a particular carrier frequency) and information about the parameter N used in the network node 20A's own cell for the particular carrier frequency to determine a common parameter N for all cells on the particular carrier frequency.

In certain embodiments, the common parameter N is determined based on one of the following: maximum parameter N used by the network node or any of the other network nodes, minimum parameter N used by the network node or any of the other network nodes, average of parameters N used by the network node and the other network nodes, or Xth percentile of parameters N used by the network node and the other network nodes.

Figure 17:
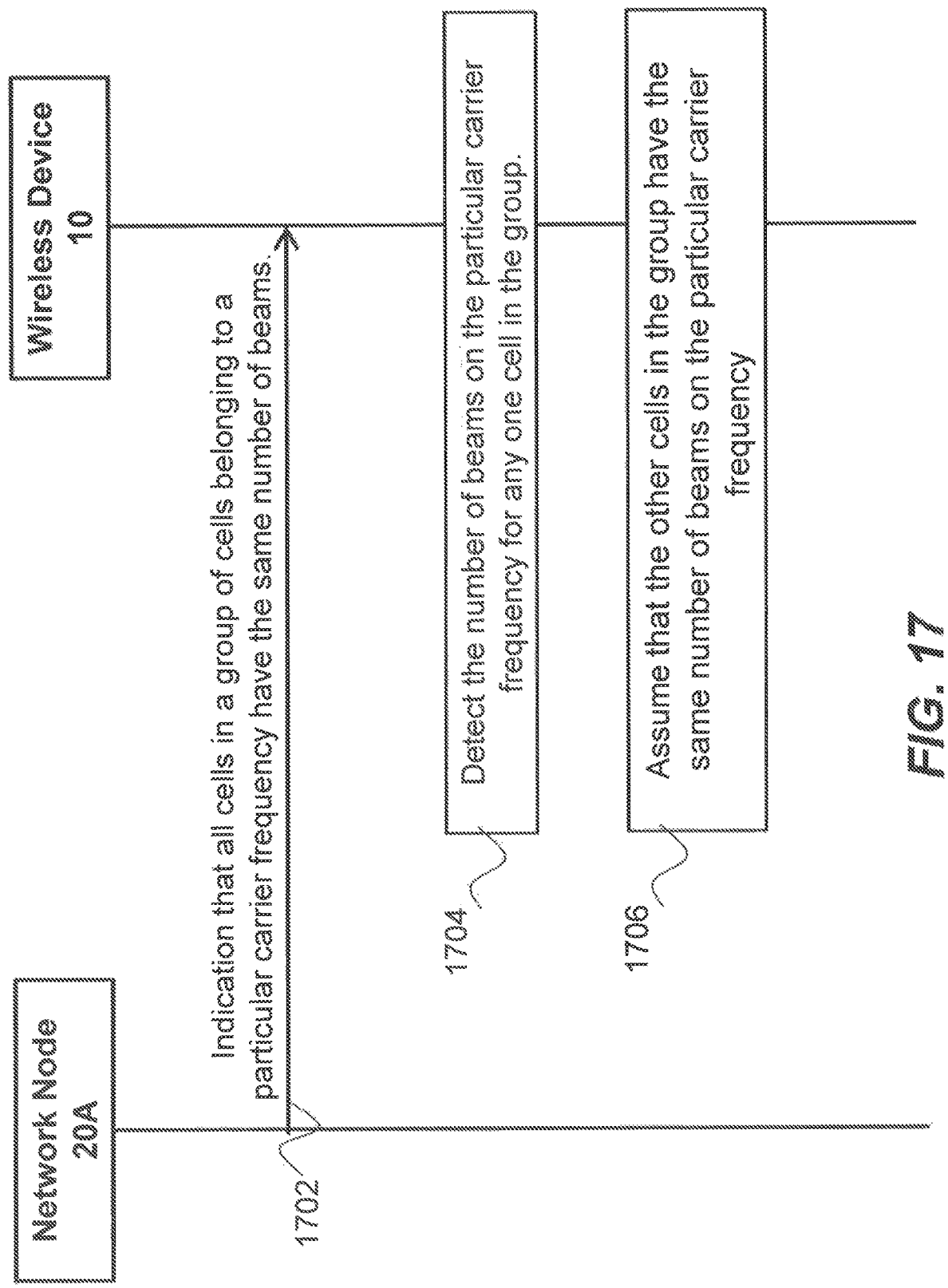
FIGS. 17-18 illustrate examples of signal flows in which a network node indicates to a wireless device whether all cells in a group of cells belonging to a particular carrier frequency have the same number of beams, in accordance with certain embodiments.
Figure 18:
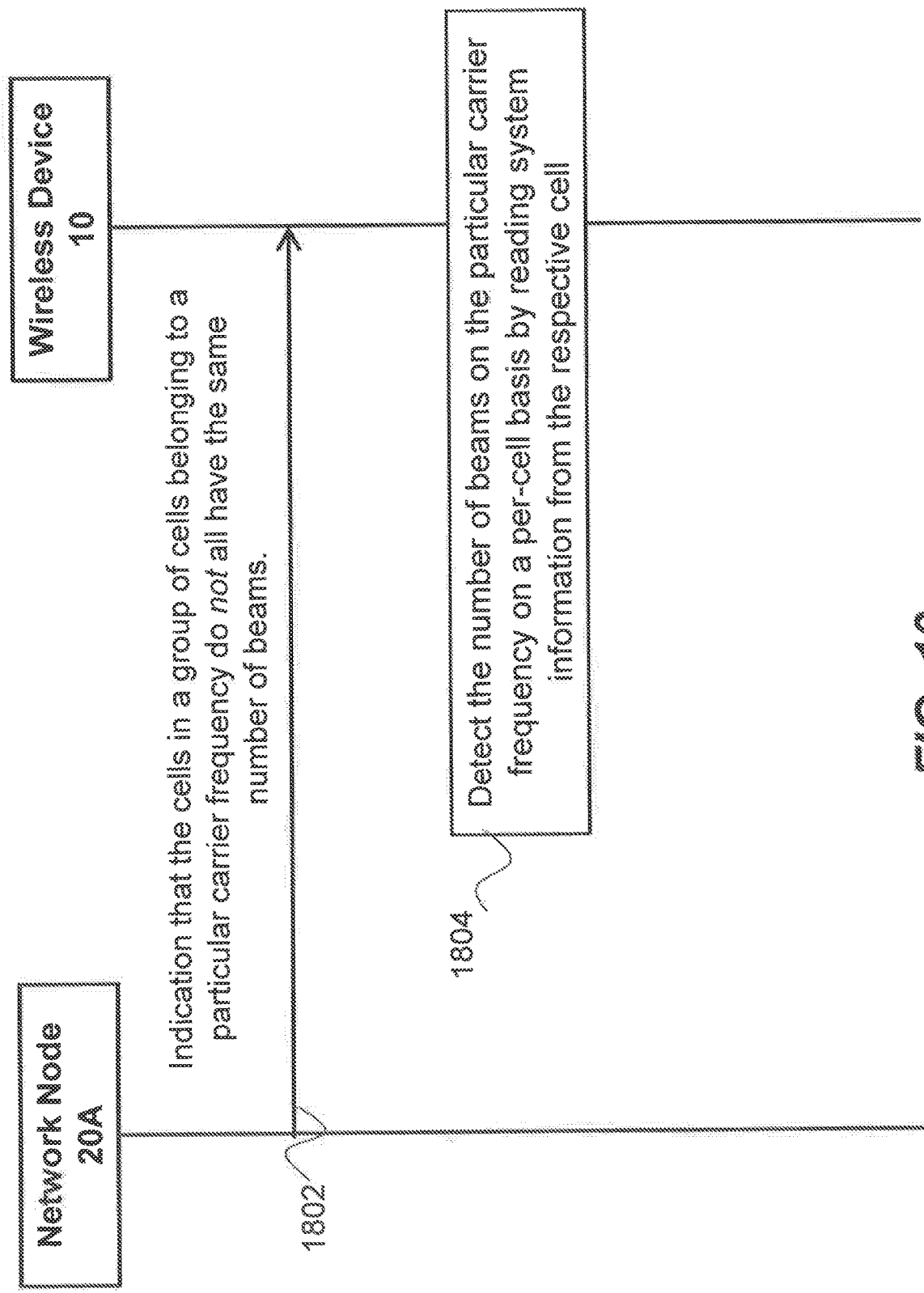

FIGS. 17-18 illustrate examples of signal flows in which network node 20A indicates to the wireless device 10 whether all cells in a group of cells belonging to a particular carrier frequency have the same number of beams, in accordance with certain embodiments. For example, in FIG. 17, network node 20A indicates that all cells in a group of cells belonging to a particular carrier frequency have the same number of beams in step 1702. Wireless device 10 receives the indication in step 1702 and, in response, detects the number of beams on the particular carrier frequency for any one cell in the group (step 1704) and assumes that the other cells in the group have the same number of beams on the particular carrier frequency (step 1706). As an example, wireless device 10 may detect that the serving cell has four beams on a first carrier frequency and may then assume that a neighbor cell in the group also has four beams on the first carrier frequency.

With respect to FIG. 18, network node 20A indicates that the cells in a group of cells belonging to a particular carrier frequency do not all have the same number of beams in step 1802. Wireless device 10 receives the indication in step 1802 and, in response, detects the number of beams on the particular carrier frequency on a per-cell basis by reading system information from the respective cell. As an example, wireless device 10 may read system information of the serving cell and system information of a neighboring cell in order to detect that the serving cell has four beams on a first carrier and the neighboring cell has eight beams on the first carrier.

Figure 19:
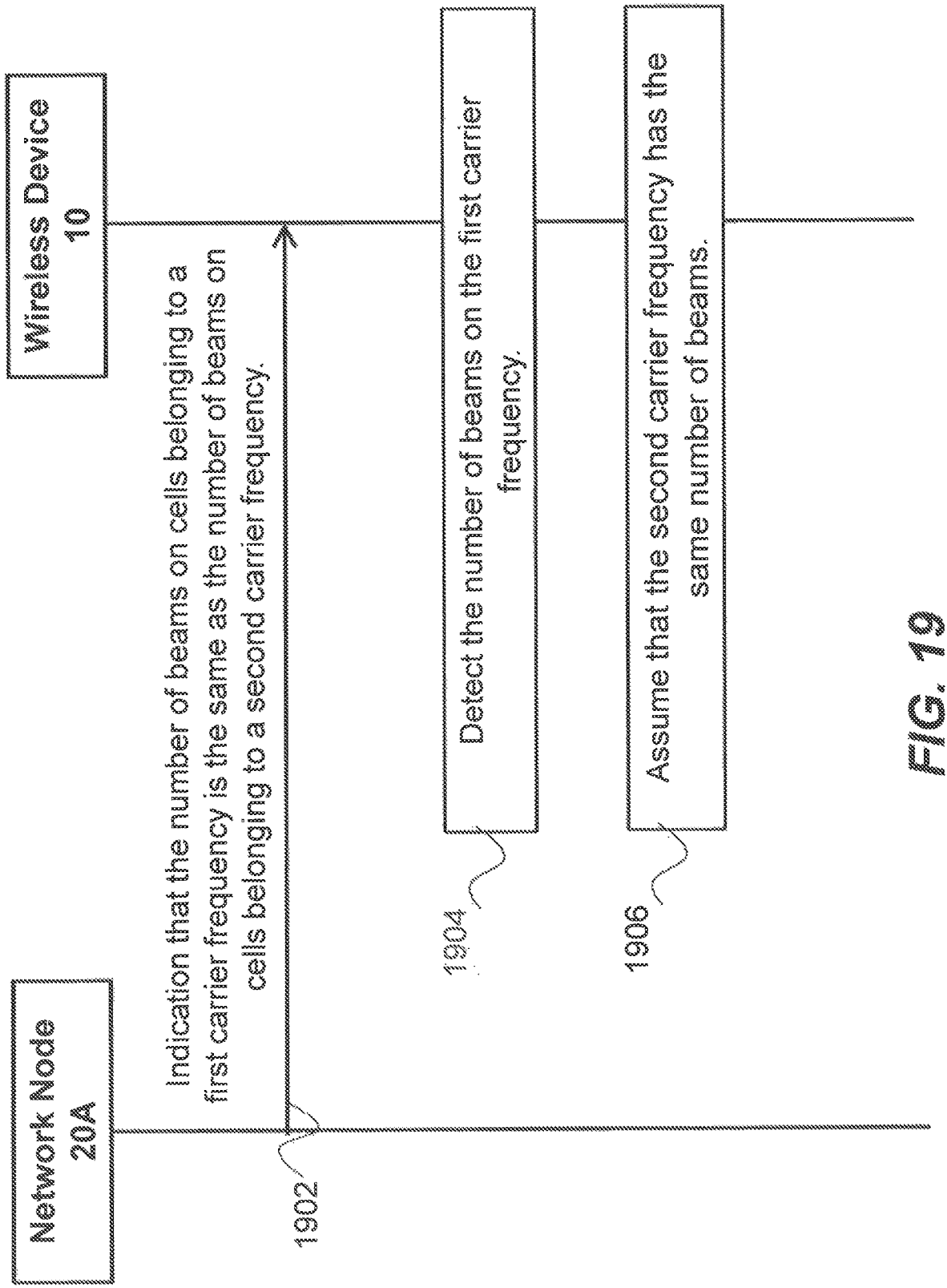
FIGS. 19-20 illustrate examples of signal flows in which a network node indicates to a wireless device whether the number of beams on cells belonging to a first carrier frequency is the same as the number of beams on cells belonging to a second carrier frequency, in accordance with certain embodiments.
Figure 20:
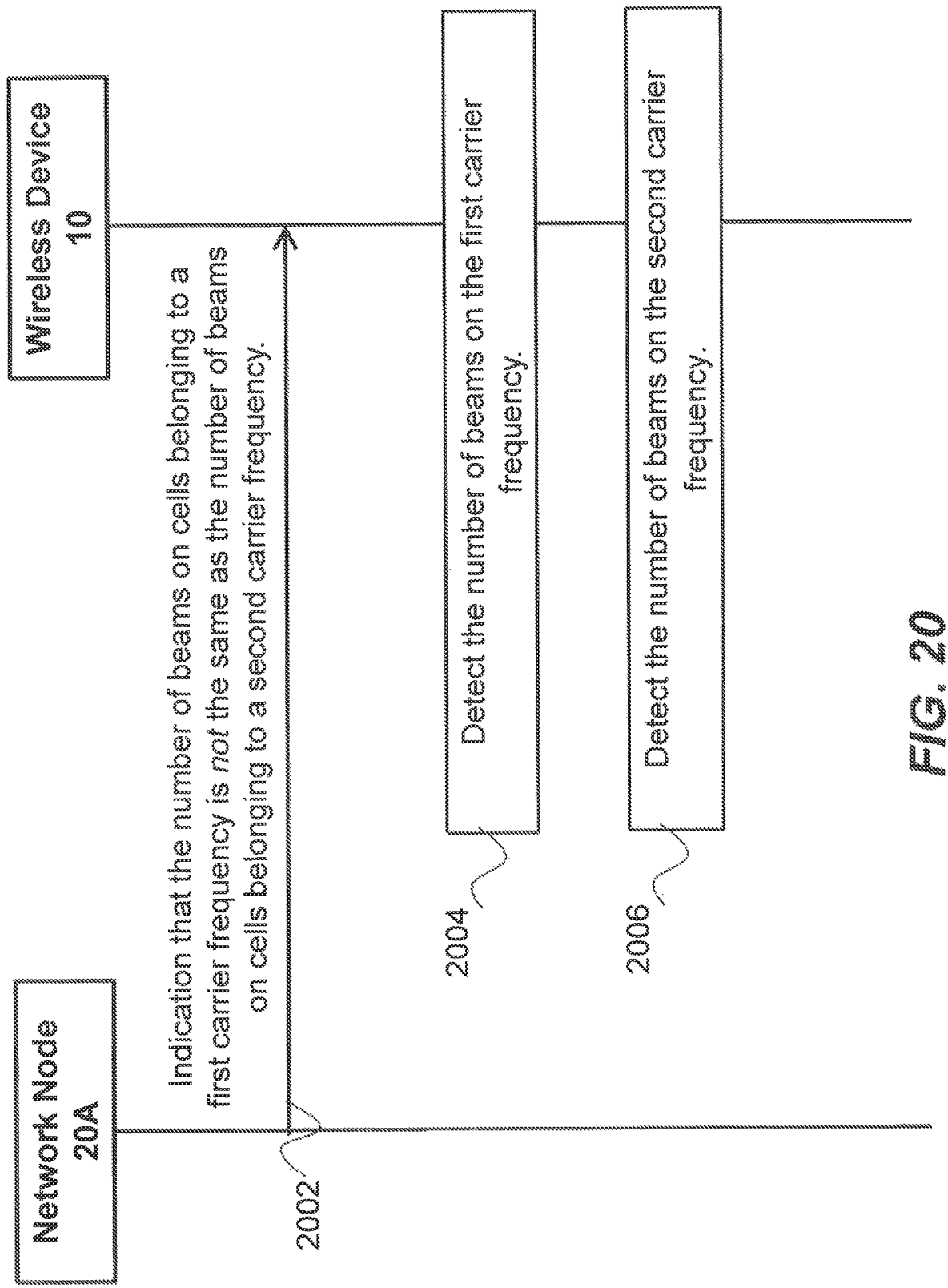

FIGS. 19-20 illustrate examples of signal flows in which network node 20A indicates to the wireless device 10 whether the number of beams on cells belonging to a first carrier frequency is the same as the number of beams on cells belonging to a second carrier frequency, in accordance with certain embodiments. For example, in step 1902 of FIG. 19, network node 20A communicates an indicator indicating that the number of beams on cells belonging to a first carrier frequency is the same as the number of beams on cells belonging to a second carrier frequency. Wireless device 10 receives the indicator in step 1902 and, in response, detects the number of beams on the first carrier frequency in step 1904. In step 1906, the wireless device assumes that the second carrier frequency has the same number of beams. As an example, wireless device 10 may detect four beams on the first carrier frequency and may then assume that the second carrier frequency also has four beams.

With respect to FIG. 20, network node 20A communicates an indicator at step 2002 indicating that the number of beams on cells belonging to the first carrier frequency is not the same as the number of beams on cells belonging to the second carrier frequency. The wireless device 20 receives the indicator in step 2002 and, in response, wireless device detects the number of beams on the first carrier frequency (step 2004) and detects the number of beams on the second carrier frequency (step 2006) (rather than assuming that the second carrier frequency has the same number of beams).

Figure 21:
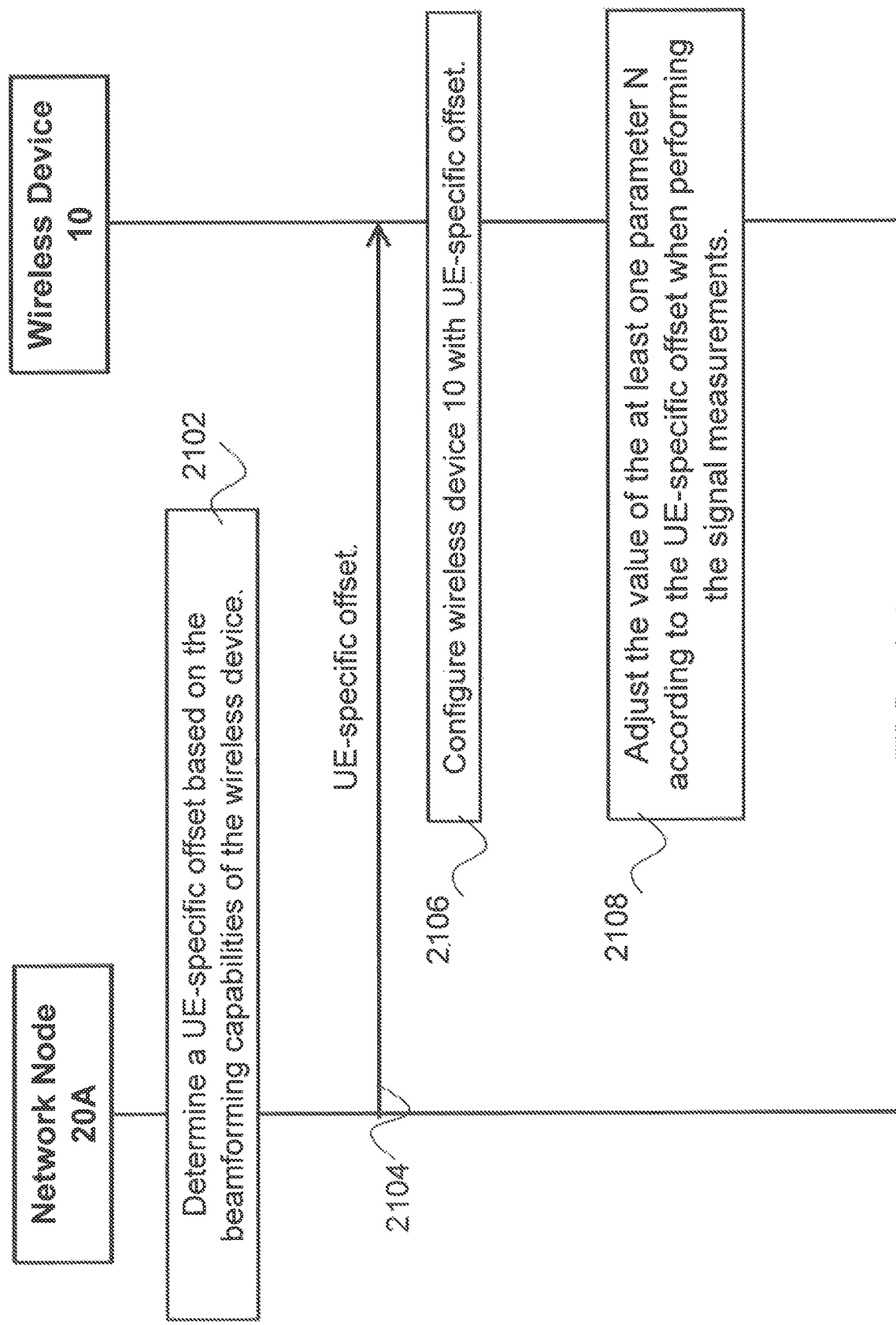
FIG. 21 illustrates an example of a signal flow in which a wireless device is configured with a UE-specific offset, in accordance with certain embodiments.

FIG. 21 illustrates an example of a signal flow in which a wireless device 10 is configured with a UE-specific offset, in accordance with certain embodiments. In step 2102, network node 20A determines a UE-specific offset based on the beamforming capabilities of the wireless device. In step 2104, network node 20A sends the UE-specific offset to the wireless device 10. The wireless device 10 receives the UE-specific offset in step 2104. In step 2106, the wireless device 10 is configured with the UE-specific offset. For example, wireless device 10 may set a configuration parameter based on the UE-specific offset. In step 2108, wireless device 10 adjusts the value of the at least one parameter N according to the UE-specific offset. As an example, if the UE-specific offset is set to +1 and the parameter N is set to 3, wireless device 10 adjusts the value of the parameter N that it uses to perform signal measurements to 4.

Figure 22:
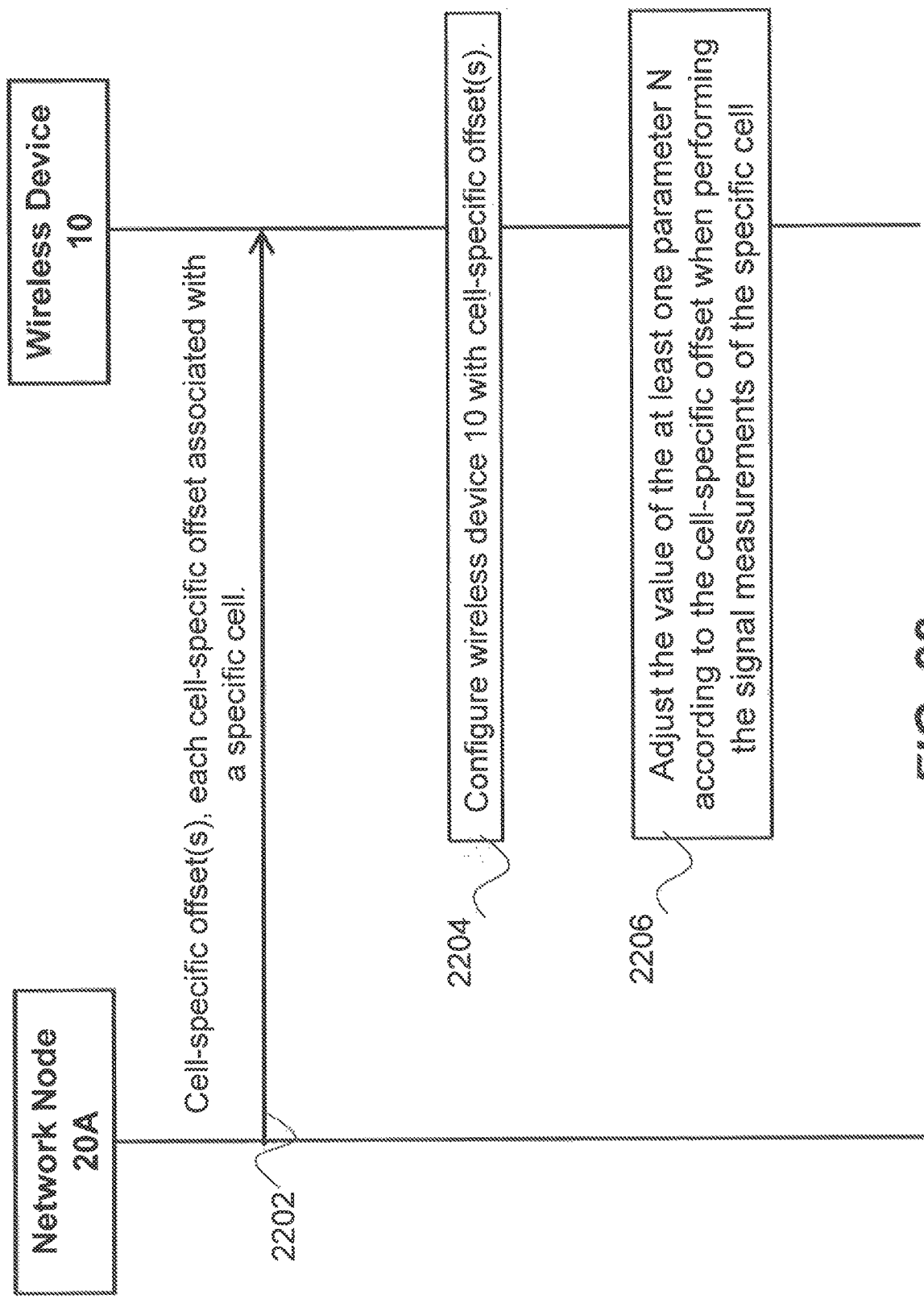
FIGS. 22-24 illustrate examples of signal flows related to cell-specific offsets, in accordance with certain embodiments.
Figure 23:
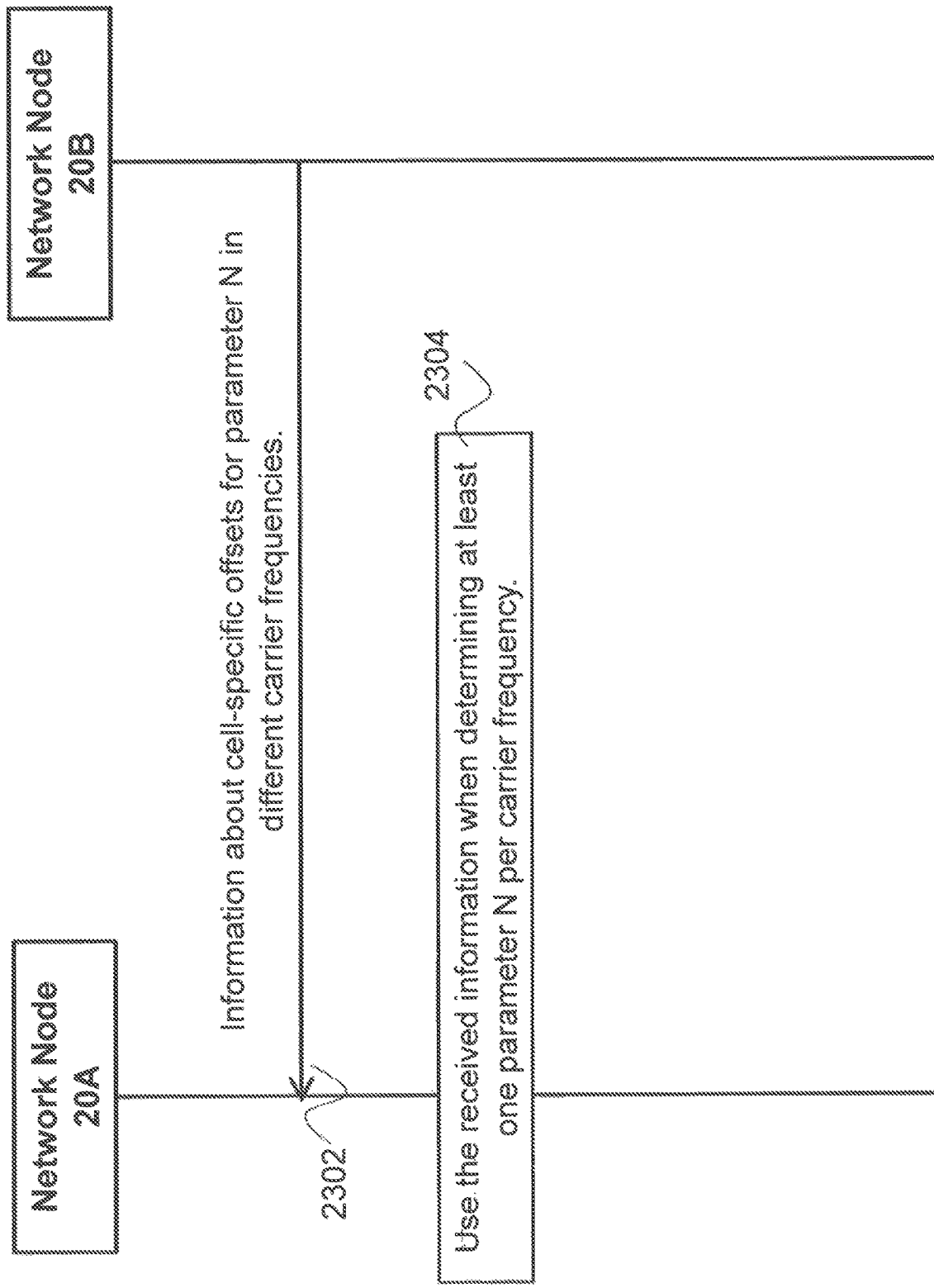
Figure 24:
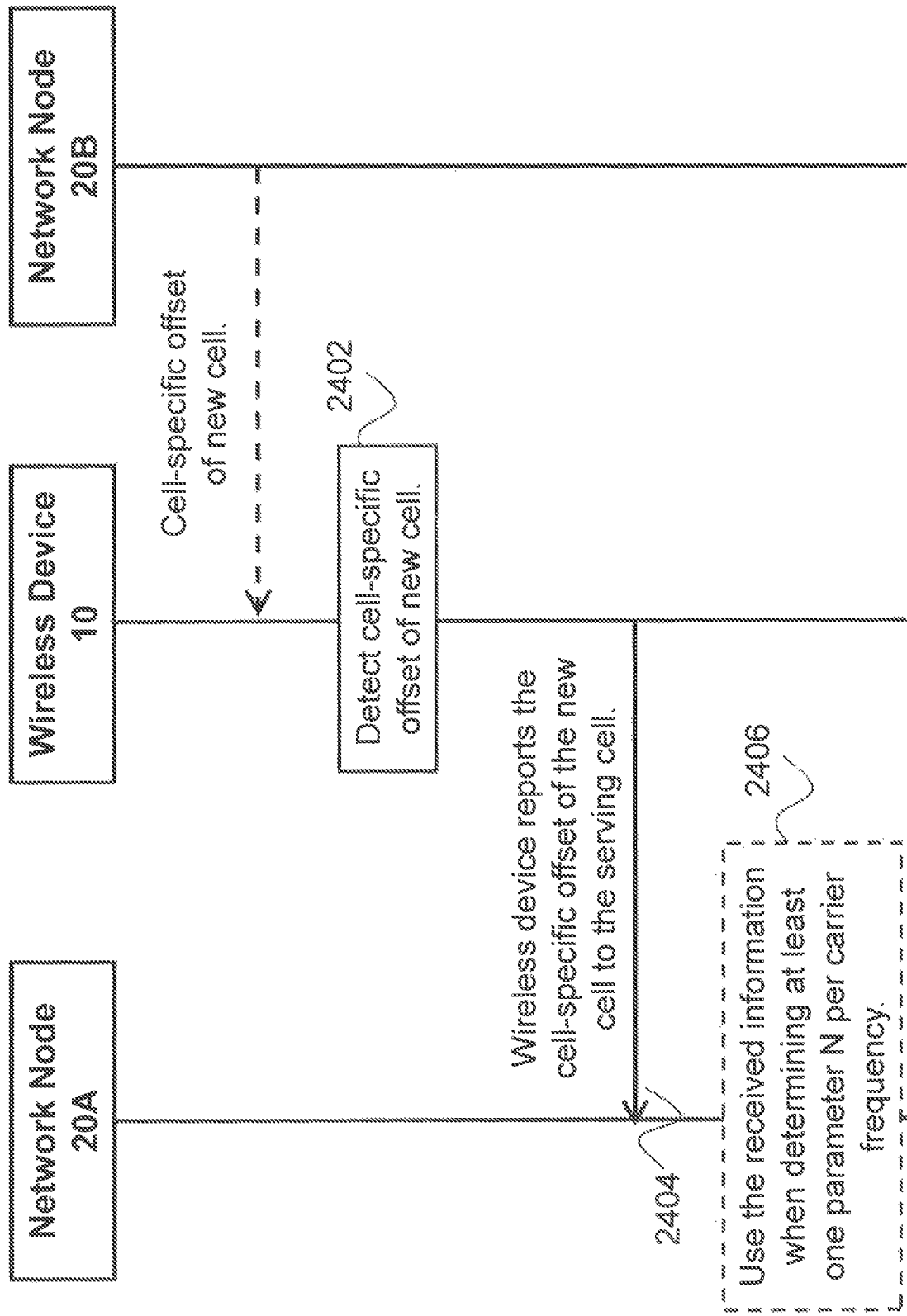

FIGS. 22-24 illustrate examples of signal flows related to cell-specific offsets, in accordance with certain embodiments. With respect to FIG. 22, at step 2202, network node 20A communicates one or more cell-specific offset(s) to wireless device 10. Each cell-specific offset is associated with a specific cell. For example, one cell specific offset can be associated with a serving cell of network node 20A and/or another cell specific offset can be associated with a neighbor cell of another network node (such as network node 20B). Wireless device receives the cell-specific offset(s) in step 2202, and in step 2204 wireless device 10 is configured with the cell-specific offset(s). For example, wireless device 10 may set one or more configuration parameters based on the cell-specific offset(s). In step 2206, wireless device 10 adjusts the value of the at least one parameter N according to the cell-specific offset when performing the signal measurements of the specific cell. As an example, if the cell-specific offset for the serving cell is set to +1 and the parameter N is set to 3 for the relevant carrier frequency, wireless device 10 adjusts the value of the parameter N such that wireless device 10 uses a value of 4 as the maximum number of beams for signal measurements of the relevant frequency carrier of the serving cell.

FIG. 23 illustrates an example in which network node 20A receives information in step 2302 about cell-specific offsets for parameter N in different carrier frequencies. The information is received from one or more other network nodes, such as network node 20B. At step 2304, network node 20A uses the received information when determining at least one parameter N per carrier frequency. In some embodiments, network node 20A may determine to send wireless device 10 a smaller parameter N for larger cell-specific offsets and a larger parameter N for smaller cell-specific offsets.

FIG. 24 illustrates an example in which wireless device 10 detects the cell-specific offset of a new cell, such as a new cell of network node 20B, in step 2402. In step 2404, wireless device 10 reports the cell-specific offset of the new cell to the serving cell (e.g., a cell of network node 20A). The network node 20A/serving cell receives the cell-specific offset of the new cell in step 2404. Optionally, network node 20A/serving cell uses the cell-specific offset of the new cell in step 2406 to determine at least one parameter N for a carrier frequency.

Any two or more embodiments described in this document may be combined in any way with each other. Furthermore, the described embodiments are not limited to the described radio access technologies. That is, the described embodiments can be adapted to other radio access technologies.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set. It is noted that the language "operable to perform an action" may include "adapted to perform the action."

Modifications, additions, or omissions may be made to the methods described herein without departing from the scope of the disclosure. The methods may include more, fewer, or other steps. Additionally, the steps of any method disclosed herein do not have to be performed in the exact order disclosed, unless explicitly stated. Although certain steps are described as optional for certain embodiments, other steps could be optional in other embodiments. All references to "a/an/the" element, apparatus, component, step, etc. are to be interpreted openly as referring to at least one instance of the element, apparatus, component, step, etc., unless explicitly stated otherwise.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

3GPP specifications, such as Rxxxx documents and TSxxx documents are publicly available at www.3gpp.org.

The invention claimed is:

1. A method for use in a network node, the method comprising:
    determining a first parameter N1, wherein the first parameter N1 indicates a maximum number of beams to be used by a wireless device for performing a first type of signal measurements on a first carrier frequency in a cell;
    determining a second parameter N2, wherein the second parameter N2 indicates a maximum number of beams to be used by the wireless device for performing a second type of signal measurements on the first carrier frequency in the cell; and
    communicating the first parameter N1 and the second parameter N2 to the wireless device, wherein the first parameter N1 and the second parameter N2 are communicated to the wireless device in a measurement object (MeasObject) information element;
    determining one or more cell-specific offsets, each cell-specific offset associated with a specific cell such that the wireless device adjusts the value of the first parameter N1 according to a cell-specific offset when performing the first type of signal measurements of the specific cell; and
    communicating the one or more cell-specific offsets to the wireless device.

2. A network node, comprising:
processing circuitry configured to:
    determine a first parameter N1, wherein the first parameter N1 indicates a maximum number of beams to be used by a wireless device for performing a first type of signal measurements on a first carrier frequency in a cell;
    determine a second parameter N2, wherein the second parameter N2 indicates a maximum number of beams to be used by the wireless device for performing a second type of signal measurements on the first carrier frequency in the cell;
    determine one or more cell-specific offsets, each cell-specific offset associated with a specific cell such that the wireless device adjusts the value of the first parameter N1 according to a cell-specific offset when performing the first type of signal measurements of the specific cell; and
a wireless interface configured to:
    communicate the first parameter N1 and the second parameter N2 to the wireless device, wherein the first parameter N1 and the second parameter N2 are communicated to the wireless device in a measurement object (MeasObject) information element; and
    send the one or more cell-specific offsets to the wireless device.

3. The network node of claim 2, wherein the first type of signal measurements comprise at least one of the following types of signal measurements: measurements of cell specific reference signals, measurements of synchronization signals, or radio resource management (RRM) measurements.

4. The network node of claim 3, wherein the second type of signal measurements comprise another one of the following types of signal measurements: measurements of cell specific reference signals, measurements of synchronization signals, or radio resource management (RRM) measurements.

5. The network node of claim 2, wherein the wireless interface is configured to communicate at least the first parameter N1 in system information broadcast by the cell.

6. The network node of claim 2, wherein the wireless interface is configured to communicate at least the first parameter N1 in dedicated signaling to the wireless device.

7. The network node of claim 2, wherein at least one of the cell-specific offsets is associated with a serving cell of the network node.

8. The network node of claim 2, one of the cell-specific offsets is associated with a neighbor cell of another network node.

9. The network node of claim 2, wherein the one or more cell-specific offsets are configured per carrier frequency.

10. The network node of claim 2, the wireless interface further configured to:
receive the cell-specific offset of a new cell from the wireless device.

11. The network node of claim 2, wherein:
the processing circuitry is further configured to determine a DE-specific offset based on the beamforming capabilities of the wireless device; and
the wireless interface is further configured to send the wireless device the DE-specific offset such that the wireless device adjusts the value of the first parameter N1 according to the DE-specific offset.

12. The network node of claim 2, wherein the second type of signal measurements is different than the first type of signal measurements.

13. A method for use in a wireless device, the method comprising:
receiving, from a network node, a first parameter N1 and a second parameter N2, the first parameter N1 and the second parameter N2 received in a measurement object (MeasObject) information element, wherein:
the first parameter N1 indicates a maximum number of beams to be used by a wireless device for performing a first type of signal measurements on a first carrier frequency in a cell; and
the second parameter N2 indicates a maximum number of beams to be used by the wireless device for performing a second type of signal measurements on the first carrier frequency in the cell; and
using the first parameter N1 when performing the first type of signal measurements on the first carrier frequency in the cell;
receiving, from the network node, one or more cell-specific offsets, each cell-specific offset associated with a specific cell such that the wireless device adjusts the value of the first parameter N1 according to a cell-specific offset when performing the first type of signal measurements of the specific cell.

14. A wireless device, comprising:
an interface configured to receive, from a network node, a first parameter N1 and a second parameter N2, the first parameter N1 and the second parameter N2 received in a measurement object (MeasObject) information element, wherein:
the first parameter N1 indicates a maximum number of beams to be used by a wireless device for performing a first type of signal measurements on a first carrier frequency in a cell; and
the second parameter N2 indicates a maximum number of beams to be used by the wireless device for performing a second type of signal measurements on the first carrier frequency in the cell; and
processing circuitry configured to use the first parameter N1 to perform the first type of signal measurements on the first carrier frequency in the cell;
the interface is further configured to receive, from the network node, one or more cell-specific offsets, each cell-specific offset associated with a specific cell such that the wireless device adjusts the value of the first parameter N1 according to a cell-specific offset when performing the first type of signal measurements of the specific cell.

15. The wireless device of claim 14, wherein the first type of signal measurements comprise at least one of the following types of signal measurements: measurements of cell specific reference signals, measurements of synchronization signals, or radio resource management (RRM) measurements.

16. The wireless device of any of claim 15, wherein the second type of signal measurements comprise another one of the following types of signal measurements: measurements of cell specific reference signals, measurements of synchronization signals, or radio resource management (RRM) measurements.

17. The wireless device of claim 14, wherein at least the first parameter N1 is received in system information broadcast by the cell.

18. The wireless device of claim 14, wherein at least the first parameter N1 is received in dedicated signaling to the wireless device.

19. The wireless device of claim 14, the processing circuitry further configured to:
configure the wireless device with the one or more cell-specific offsets.

20. The wireless device of claim 19, wherein at least one of the cell-specific offsets is associated with a serving cell.

21. The wireless device of claim 19, wherein at least one of the cell-specific offsets is associated with a neighbor cell.

22. The wireless device of claim 21, wherein the cell-specific offset associated with the neighbor cell is received from the serving cell.

23. The wireless device of claim 19, wherein the one or more cell-specific offsets are configured per carrier frequency.

24. The wireless device of claim 19, the processing circuitry further configured to:
detect the cell-specific offset of a new cell; and
report the cell-specific offset of the new cell to the serving cell.

25. The wireless device of claim 14, the processing circuitry further configured to:
configure the wireless device with a DE-specific offset associated with the particular wireless device such that the wireless device adjusts the value of the first parameter N1 according to the DE-specific offset.

26. The wireless device of claim 14, wherein the first parameter N1 and the second parameter N2 are received from the network node by the wireless device in a measurement object (MeasObject) information element.

* * * * *

UNITED STATES PATENT AND TRADEMARK OFFICE
CERTIFICATE OF CORRECTION

PATENT NO. : 11,595,840 B2
APPLICATION NO. : 16/493152
DATED : February 28, 2023
INVENTOR(S) : Da Silva et al.

It is certified that error appears in the above-identified patent and that said Letters Patent is hereby corrected as shown below:

On the Title Page

On Page 2, in Item (56), under "OTHER PUBLICATIONS", in Column 2, Line 13, delete "Yeporting" and insert -- reporting --, therefor.

In the Drawings

In Fig. 7, Sheet 7 of 26, delete Tag "20b" and insert Tag -- 20B --, therefor.

In Fig. 7, Sheet 7 of 26, delete Tag "20a" and insert Tag -- 20A --, therefor.

In the Specification

In Column 3, Lines 46-47, delete "synchronization sequences" and insert -- synchronization signals --, therefor.

In Column 4, Line 28, delete "applied" and insert -- applied. --, therefor.

In Column 4, Line 30, delete "quality)" and insert -- quality). --, therefor.

In Column 4, Line 34, delete "beams)" and insert -- beams). --, therefor.

In Column 14, Lines 58-59, delete "machine-to-machine communication (M2M)," and insert -- machine-to-machine (M2M) communication, --, therefor.

In Column 14, Lines 60-61, delete "laptop embedded equipped (LEE)," and insert -- laptop embedded equipment (LEE), --, therefor.

In Column 15, Line 4, delete "(RRU)" and insert -- (RRU), --, therefor.

Signed and Sealed this
Eleventh Day of February, 2025

Coke Morgan Stewart
*Acting Director of the United States Patent and Trademark Office*

CERTIFICATE OF CORRECTION (continued)
U.S. Pat. No. 11,595,840 B2

In Column 15, Line 54, delete "receive strength signal indicator (RSSI)," and insert -- received signal strength indicator (RSSI), --, therefor.

In Column 16, Line 17, delete "N13, . . . N1m)" and insert -- N13, . . . , N1m) --, therefor.

In Column 16, Line 18, delete "F2, . . . F1m)." and insert -- F2, . . . , F1m). --, therefor.

In Column 16, Line 20, delete "F2, . . . F1m" and insert -- F2, . . . , F1m --, therefor.

In Column 17, Line 32, delete "N12, . . . N1n" and insert -- N12, . . . , N1n --, therefor.

In Column 17, Line 33, delete "F2, . . . Fn" and insert -- F2, . . . , Fn --, therefor.

In Column 17, Line 51, delete "N=F(M1,M2,M3, . . . Mk)" and insert -- N=F(M1, M2, M3, . . . , Mk) --, therefor.

In Column 19, Line 4, delete "interconnecting network 125" and insert -- interconnecting network 25 --, therefor.

In Column 20, Line 17, delete "and/or or any" and insert -- and/or any --, therefor.

In Column 20, Lines 42-43, delete "communicating module(s) 92," and insert -- communication module(s) 92, --, therefor.

In Column 21, Lines 14-15, delete "communication module 93" and insert -- communication module 92 --, therefor.

In Column 22, Line 41, delete "and/or or any" and insert -- and/or any --, therefor.

In Column 23, Lines 9-10, delete "communicating module(s) 1104," and insert -- communication module(s) 1104, --, therefor.

In Column 23, Line 53, delete "communication module 1106" and insert -- communication module 1104 --, therefor.

In the Claims

In Column 30, Line 12, in Claim 1, delete "use m a" and insert -- use in a --, therefor.

In Column 30, Line 23, in Claim 1, delete "cell; and" and insert -- cell; --, therefor.

In Column 31, Line 17, in Claim 8, delete "claim 2, one of the" and insert -- claim 2, wherein at least one of the --, therefor.

In Column 31, Line 28, in Claim 11, delete "DE-specific offset" and insert -- UE-specific offset --, therefor.

CERTIFICATE OF CORRECTION (continued)
U.S. Pat. No. 11,595,840 B2

In Column 31, Line 31, in Claim 11, delete "DE-specific offset" and insert -- UE-specific offset --, therefor.

In Column 31, Line 33, in Claim 11, delete "DE-specific offset." and insert -- UE-specific offset. --, therefor.

In Column 31, Line 50, in Claim 13, delete "cell; and" and insert -- cell; --, therefor.

In Column 31, Line 53, in Claim 13, delete "cell;" and insert -- cell; and --, therefor.

In Column 32, Line 8, in Claim 14, delete "cell; and" and insert -- cell; --, therefor.

In Column 32, Line 11, in Claim 14, delete "cell;" and insert -- cell; and --, therefor.

In Column 32, Line 24, in Claim 16, delete "The wireless device of any of claim" and insert -- The wireless device of claim --, therefor.

In Column 32, Line 57, in Claim 25, delete "DE-specific offset" and insert -- UE-specific offset --, therefor.

In Column 32, Line 60, in Claim 25, delete "DE-specific offset." and insert -- UE-specific offset. --, therefor.